United States Patent
Obata et al.

(10) Patent No.: US 7,259,876 B2
(45) Date of Patent: Aug. 21, 2007

(54) IMAGE PROCESSING APPARATUS, AND, CONTROL METHOD AND CONTROL DEVICE THEREFOR

(75) Inventors: Yuriko Obata, Tokyo (JP); Norio Michiie, Tokyo (JP); Kiyotaka Moteki, Tokyo (JP); Hiromitsu Shimizu, Tokyo (JP); Takao Okamura, Tokyo (JP); Yasuhiro Hattori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 881 days.

(21) Appl. No.: 10/183,499

(22) Filed: Jun. 28, 2002

(65) Prior Publication Data

US 2003/0011821 A1  Jan. 16, 2003

(30) Foreign Application Priority Data

Jun. 29, 2001 (JP) ............................. 2001-199435
Jul. 17, 2001 (JP) ............................. 2001-216429
Jun. 27, 2002 (JP) ............................. 2002-188183

(51) Int. Cl.
    G06F 3/12 (2006.01)
(52) U.S. Cl. .................. 358/1.13; 358/1.15; 358/1.18; 358/1.16; 710/306; 710/22; 710/23; 710/24; 710/25; 710/26; 710/27; 710/28; 710/52
(58) Field of Classification Search .............. 358/1.13, 358/1.15, 1.16; 710/308, 22–28, 52
See application file for complete search history.

(56) References Cited

U.S. PATENT DOCUMENTS 5,124,798 A     6/1992   Tanabe et al.
5,294,944 A     3/1994   Takeyama et al.
5,432,537 A     7/1995   Imakawa et al.
5,610,651 A     3/1997   Yamakawa et al.
5,944,802 A *   8/1999   Bello et al. .................... 710/52
5,987,227 A    11/1999   Endo et al.
6,043,897 A     3/2000   Morikawa et al.
6,184,999 B1    2/2001   Yoshida et al.
6,222,636 B1*   4/2001   Gerstenberger ............ 358/1.15
6,226,102 B1    5/2001   Koike et al.
6,278,796 B1*   8/2001   Drisko et al. ............... 382/145
6,333,992 B1*  12/2001   Yamamura et al. ......... 382/149
6,449,064 B1    9/2002   Hattori et al.
6,621,940 B2*   9/2003   Chapin et al. .............. 382/297
6,891,632 B2*   5/2005   Schwartz .................... 358/1.15
6,894,802 B1*   5/2005   Biondi et al. .............. 358/1.16

FOREIGN PATENT DOCUMENTS

EP    0 465 093    1/1992
EP    0 705 021    4/1996

* cited by examiner

*Primary Examiner*—Twyler Lamb
*Assistant Examiner*—Robert N. Kang
(74) *Attorney, Agent, or Firm*—Oblon, Spivak, McClelland, Maier & Neustadt, P.C.

(57) ABSTRACT

A first storage stores input image data. A second storage stores image data read from the first storage. A control part determines, with respect to a timing at which data transfer of image data into the first storage, a data transfer of the said image data from the first storage to the second storage, based on a rate of data transfer and writing of the image data into the first storage and rate of data transfer and writing of the image data into the second storage from the first storage.

26 Claims, 23 Drawing Sheets

FIG.8

MEMORY DATA TRANSFER RATE MEASUREMENT

| YES | NO |

DATA DELETION AFTER MEASUREMENT

| YES | NO |

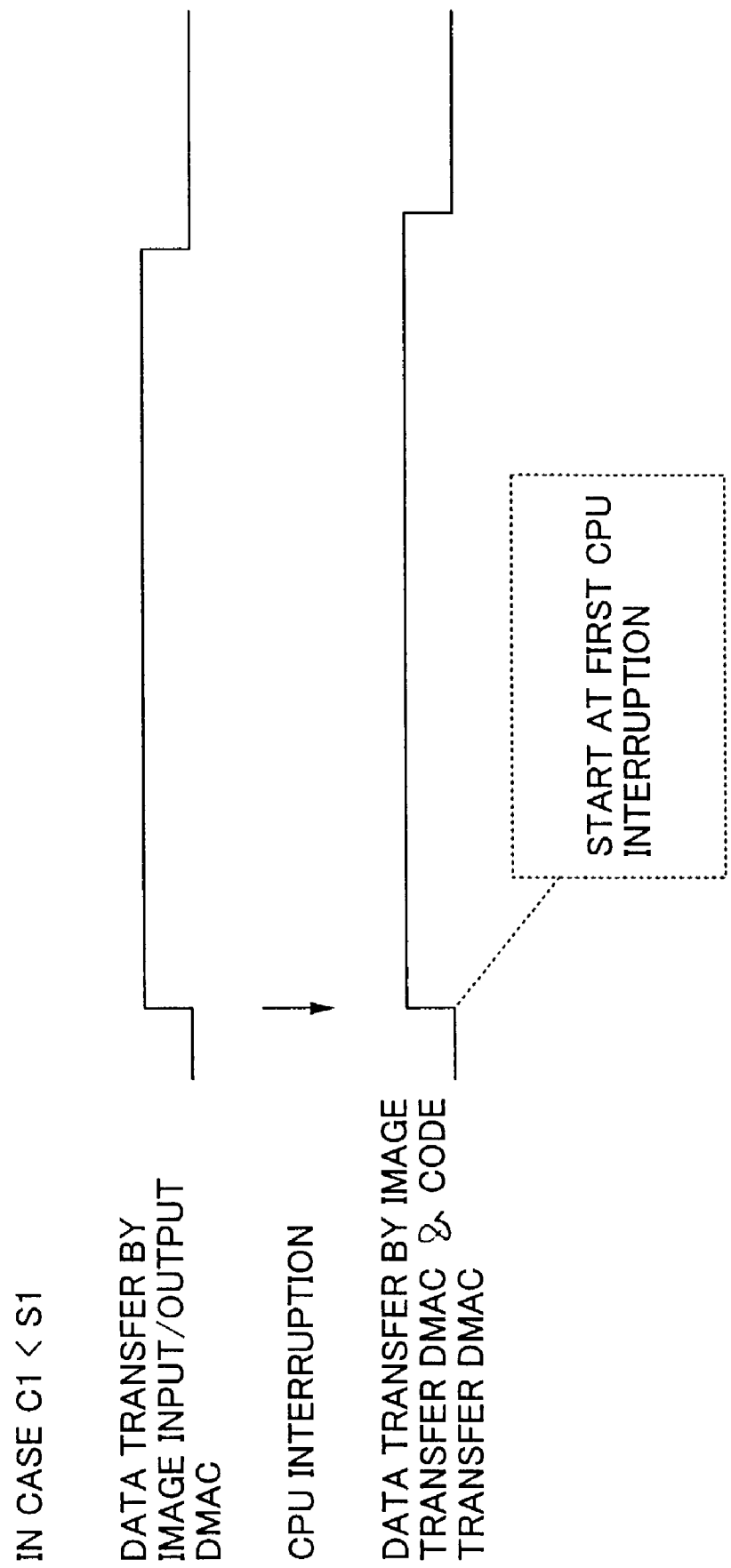

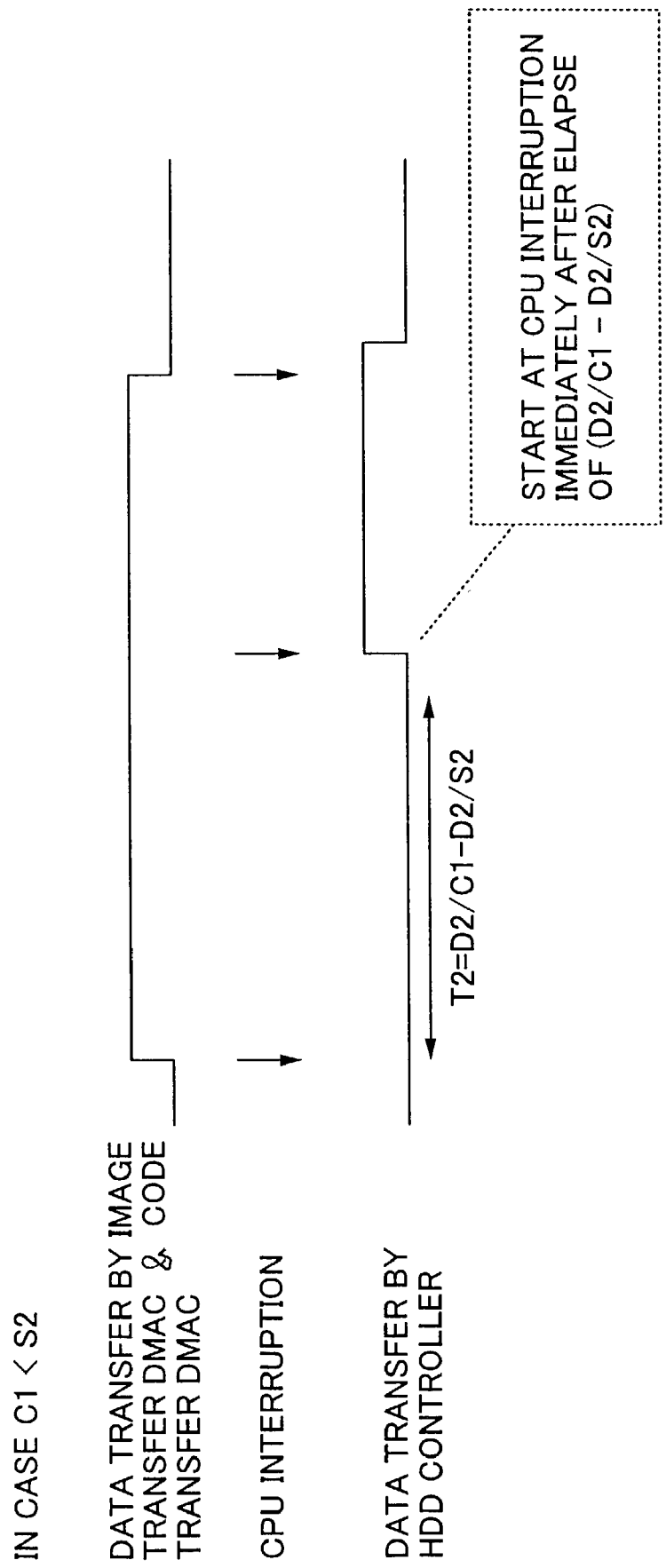

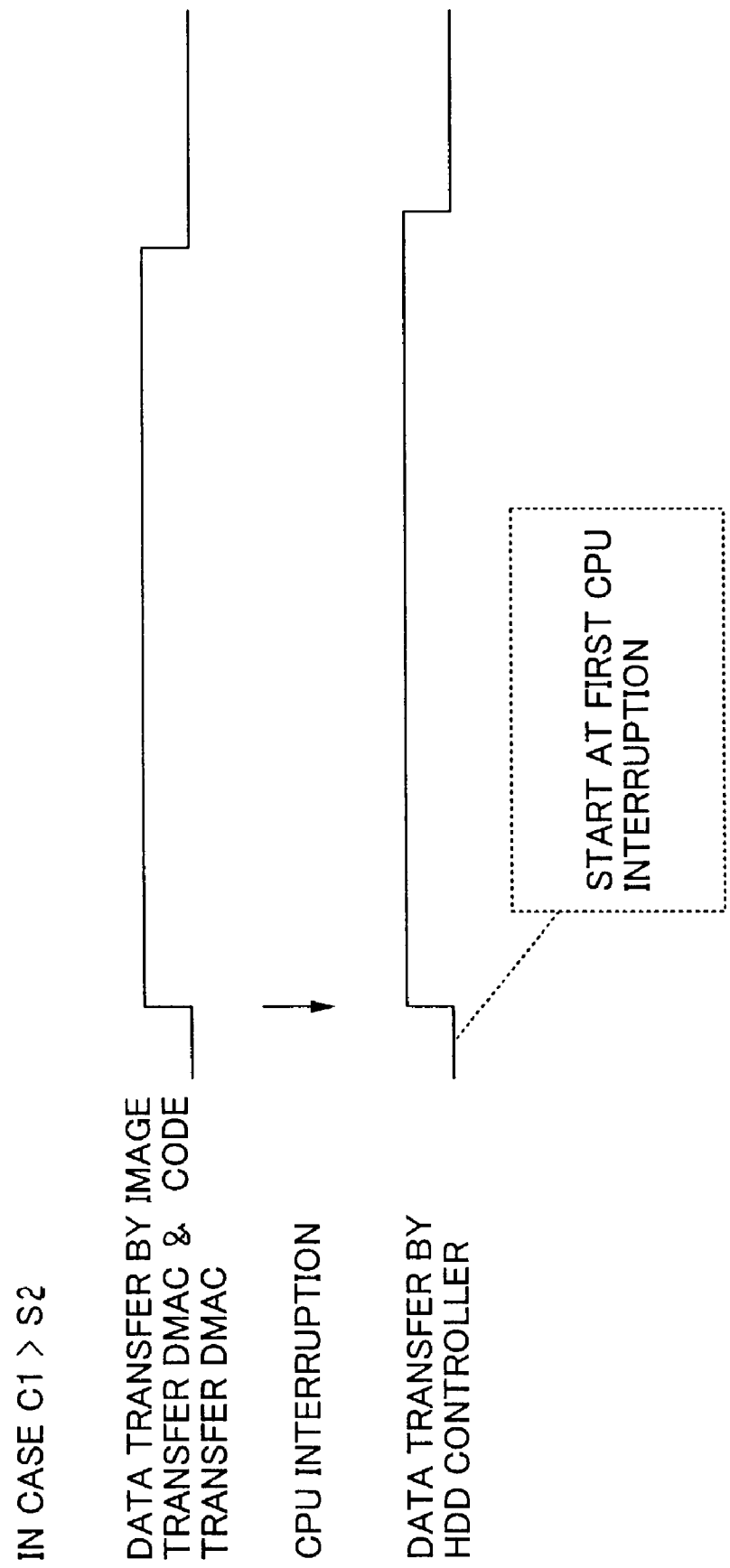

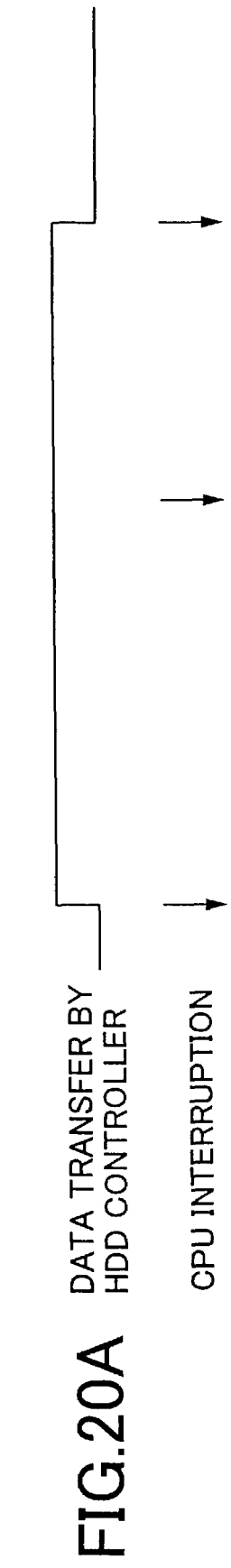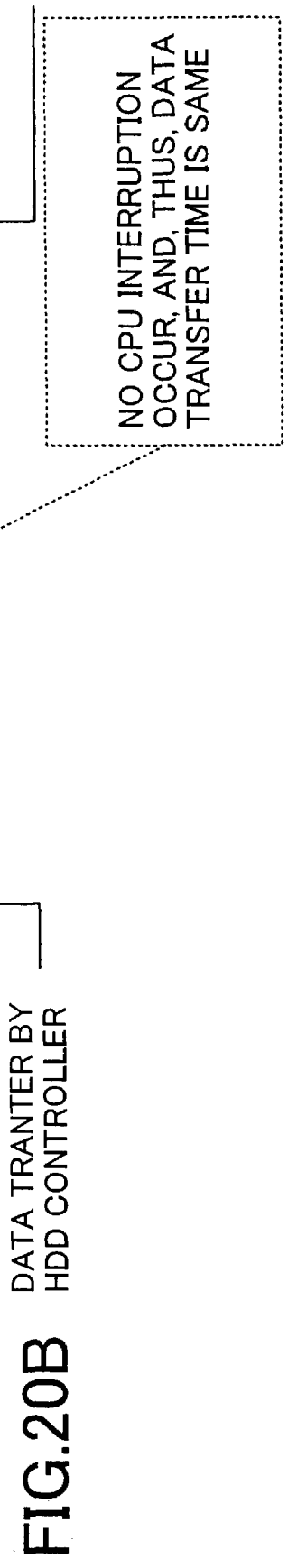
FIG.20A / FIG.20B — IN CASE OF EXCLUSIVE CONTROL

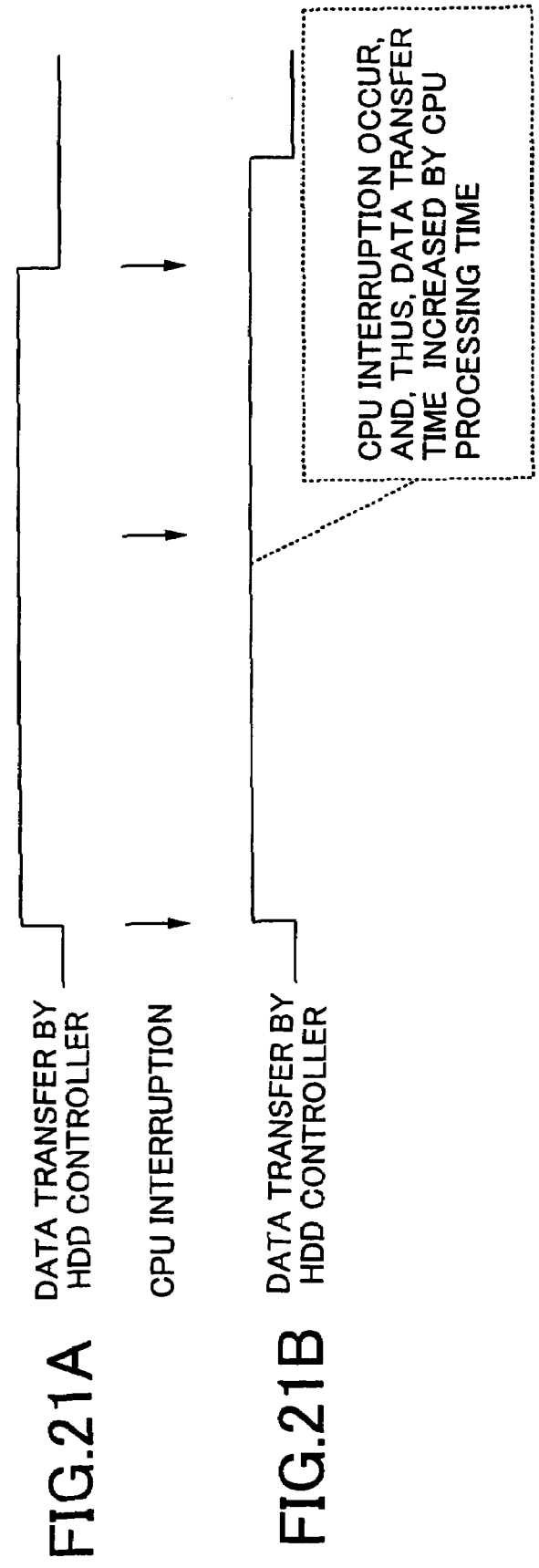

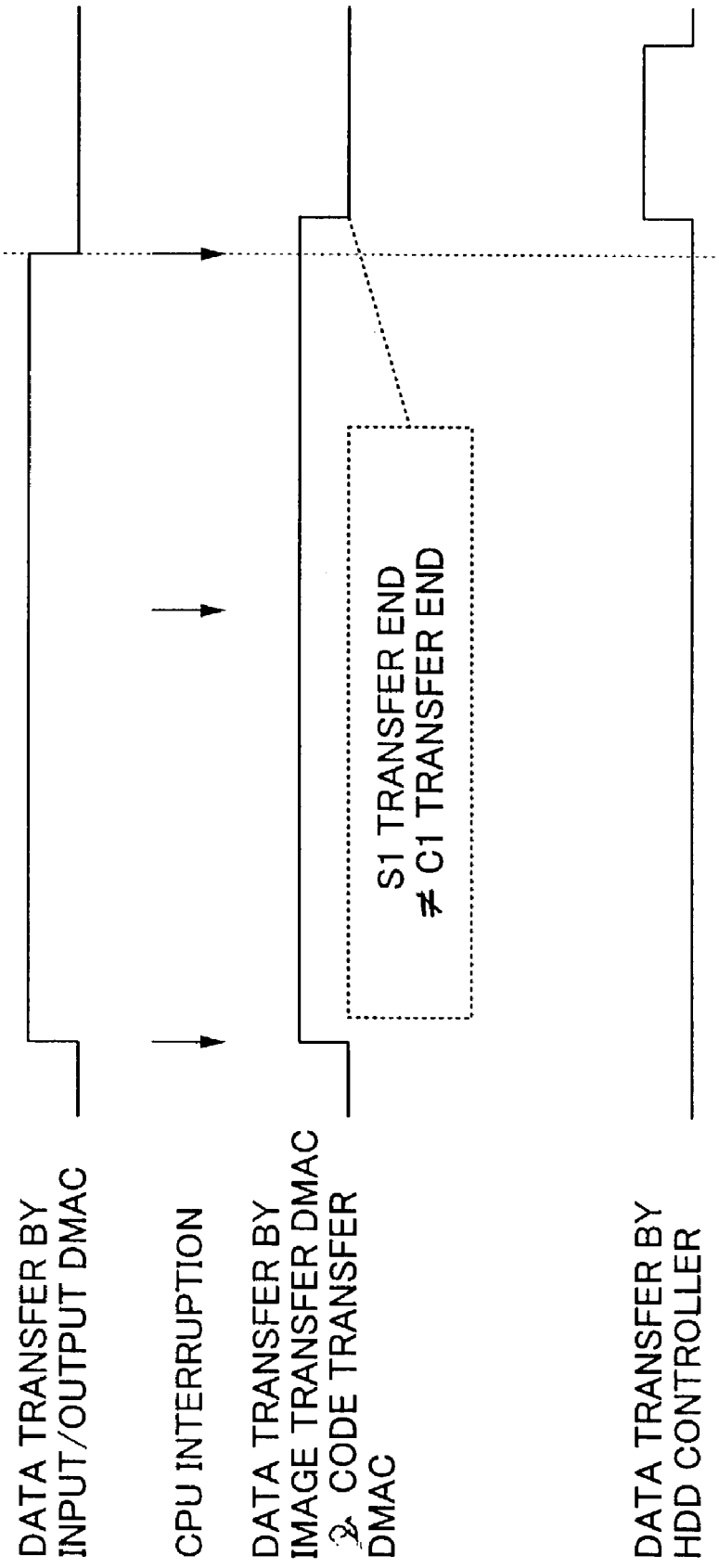

IMAGE PROCESSING APPARATUS, AND, CONTROL METHOD AND CONTROL DEVICE THEREFOR

BACKGROUND OF THE INVENTION

1. Field of the Invention

The present invention relates to an image processing apparatus, and its control method and control device. In particular, the present invention relates to an image processing apparatus which employs a combination of primary and secondary storages wherein given image data is stored in the secondary storage through the primary storage, and to its control method and control device. More specifically, the present invention relates to an image processing apparatus such as a digital copier, a facsimile apparatus, a printer, and so forth wherein image data finally stored in the secondary storage is output in a desired timing in a desired manner.

2. The Description of the Related Art

Digitization on image processing apparatus, such as a copier, progresses in recent years, and, also, for the purpose of image data processing and editing, a semiconductor memory (image memory) is utilized in many cases. An image processing apparatus such as a digital copier has a copy function including a so-called "electronic sorting" function. This function is such that a plurality of sheets of paper to be copied are first stored in a semiconductor memory collectively, and, then, the thus-stored image data is printed out in a manner such that each of the sheets of paper is copied, one by one, in a desired manner. By this function, a sheet classification work after the copy can be reduced remarkably.

In such a machine, it is necessary to hold temporarily image data of a plurality of pages. In this case, if such a large amount of image data is stored in a semiconductor memory (primary storage), as the semiconductor memory has a not so reduced unit price per storage capacity, the machine itself may become increased in the total price. For solution of this problem, a mass storage device such as a hard disk drive having a relatively reduced unit price per storage capacity is employed in addition to the semiconductor memory.

In such a case, image data input through a scanning device or the like is first stored in a semiconductor memory, and, then, if needed, the same image data is transferred to the above-mentioned mass storage device in which the image data is then held.

In order to perform input and output (reading and writing) of image data to/from the image memory which consists of the above-mentioned semiconductor memory, a direct memory access controller (referred to as a DMAC, hereinafter) may be used in many cases.

DMAC performs control for outputting and inputting image data from/to a memory area of the image memory based on memory area management information called a 'descriptor'. In this case, a plurality of descriptors are provided, and the whole memory area is divided into the respective division areas, each of which is controlled by the respective one of the descriptors.

Thus, it becomes possible to perform input and output of image data to/from an image memory having a storage capacity smaller than the whole data amount of the image data, by using the image memory divided into a plurality of memory areas used in a form of, for example, a ring buffer.

In memory control using DMAC, it is possible to perform, individually for respective descriptors, control of progress (starting/terminating) of input and output (transfer) of image data on data amount specified for each descriptor, and execution timing control (control of interrupting/resuming of input and output of image data in predetermined timing) of transfer of the image data in amount specified for each descriptor. For this reason, according to memory control using DMAC, flexibility of timing control of input and output of image data to/from a semiconductor memory and another mass storage device controlled under DMAC is high, and, thus, it is possible to apply this control scheme to a wide range of memory application field.

In general, a plurality of sets of image data cannot be simultaneously input/output (written into/read out) to/from the above-mentioned mass storage device such as a hard disk drive (HDD). However, by utilizing such a memory control scheme using DMAC, data transfer job to the above-mentioned mass storage device can be divided into a plurality of ones by the respective descriptors, and thereby, it is possible to process each data transfer job in a time division manner. Thereby, the image data divided into the plurality of sets can be transferred in parallel apparently.

However, when using processing in time division manner, the time which data transfer takes as total does not become shorter. For this reason, in case improvement in productivity of apparatus is strongly requested, i.e., a digital copier, or the like, such a method of applying time division manner cannot necessarily be said to be an optimum method. In order to solve this problem, once image data is compressed, and, after that, it is transferred into the storage device. Thereby, it is possible to substantially reduce the amount of data to be transferred and written to the storage device. As a result, it is possible to effectively reduce the time required, and, thus, to improve the productivity or yield of the system/apparatus such as a digital copier.

Furthermore, for the purpose of simplification of memory control, a scheme may be applied, in which, rather without applying the time division manner, but a mass storage device is occupied for a predetermined time interval, and, during the interval, in synchronization with image inputting operation by a scanner or the like, transfer of the same image data to the mass storage device is performed.

SUMMARY OF THE INVENTION

Generally, a data transfer rate on image data from a semiconductor memory to a mass storage device such as a hard disk drive (HDD) is fairly slower than data transfer rate on image data from an image input-and-output device to the semiconductor memory. Therefore, although the image data transferred to the mass storage device from the semiconductor memory is compressed beforehand and the amount of data is made smaller as mentioned above, the difference from the transfer rate on image data from the image input-and-output device to the semiconductor memory is still large.

For this reason, the degree of contribution to improvement in the productivity of the image processing apparatus may not be large enough even when control of the start timing of the data transfer processing (including data conversion processing of data compression etc.) to the mass storage device from the semiconductor memory is controlled independently.

Moreover, improvement in data transfer rate to the mass storage device, such as HDD accompanying a progress of the latest technology, and improvement in the rate of data compression by the data compression device and processing rate are remarkable. Furthermore, the image input-and-output device to be connected with the image processing apparatus may be of various types.

In such an environment, it is not necessarily easy to raise productivity according to conventional memory control scheme even by utilizing the improved capability of mass storage device and/or data compression device to the maximum extent.

The present invention has been made in view of such a situation, and aims at raising the efficiency in case of transferring and saving input image data in a secondary storage via a primary storage in an image processing apparatus which employs image storage system combining the above primary storage (semiconductor memory) and secondary storage (mass storage device).

In order to attain the above-mentioned purpose, according to the present invention, the progress state of data transfer to a first storage, such as a primary storage, from an image inputting device is recognized. The rate of data transfer to the second storage, such as secondary storage, from the first storage is recognized. Based on these recognition results, data transfer start timing from the first storage to the second storage is determined with respect to data transfer start timing from the data inputting device to the first storage.

Thereby, it becomes possible to make coincide the completion time of data transfer and writing to the first storage with the completion time of data transfer and writing of the same data from the first storage to the second storage.

Consequently, for example, it is possible to avoid starting the data transfer from the first storage to the second storage were made too much early so that the data which should be transferred to the second storage would not be left in the first storage before the data transfer to the first storage is completed. In fact, if such a situation of no data left in the first storage before data transfer to the first storage has been completed occurred, the data transfer from the first storage to the second storage should be interrupted, and, thus, efficiency in the data transfer would be degraded.

Moreover, conversely, it is also possible to avoid starting the data transfer from the first storage to the second storage too late so that the data transfer to the second storage from the first storage should be continued for a considerable time, thereby, productivity of the whole system/apparatus would be degraded.

Other objects and further features of the present invention will become more apparent from the following detailed description when read in conjunction with the accompanying drawings.

BRIEF DESCRIPTION OF THE DRAWINGS

FIG. 8 shows an example of a transfer rate measurement instruction panel image displayed on a character display device with a touch panel of an operation part of FIG. 1;

FIG. 17 shows a timing chart for illustrating data transfer start timing by the image transfer DMAC, and the code transfer DMAC when the data transfer rate by the image input and output DMAC is faster than the compression processing rate with the compression/decompression unit of FIG. 14;

FIG. 18 shows a timing chart for illustrating data transfer start timing by the image transfer DMAC and code transfer DMAC when the compression processing rate with the compression/decompression unit is slower than the data transfer rate by the image input and output DMAC of FIG. 14;

FIG. 19 shows a timing chart for illustrating data transfer start timing by the image transfer DMAC and code transfer DMAC when the compression processing rate with the compression/decompression unit is faster than the data transfer rate by the image input and output DMAC of FIG. 14;

FIGS. 20A and 20B show a timing chart for illustrating processing in case the memory control part of FIG. 14 performs exclusive control at a time of resource acquisition of HDD;

FIGS. 21A and 21B show a timing chart for illustrating processing in case the memory control part of FIG. 14 does not perform the exclusive control at a time of resource acquisition of HDD;

FIG. 23 shows a timing chart for illustrating data transfer start timing by the image transfer DMAC and code transfer DMAC when the data transfer rate by the image input and output DMAC is faster than the compression processing rate with the compression/decompression unit of FIG. 14.

DETAILED DESCRIPTION OF THE PREFERRED EMBODIMENTS

Embodiments of the present invention will now be described with reference to figures.

Figure 2:
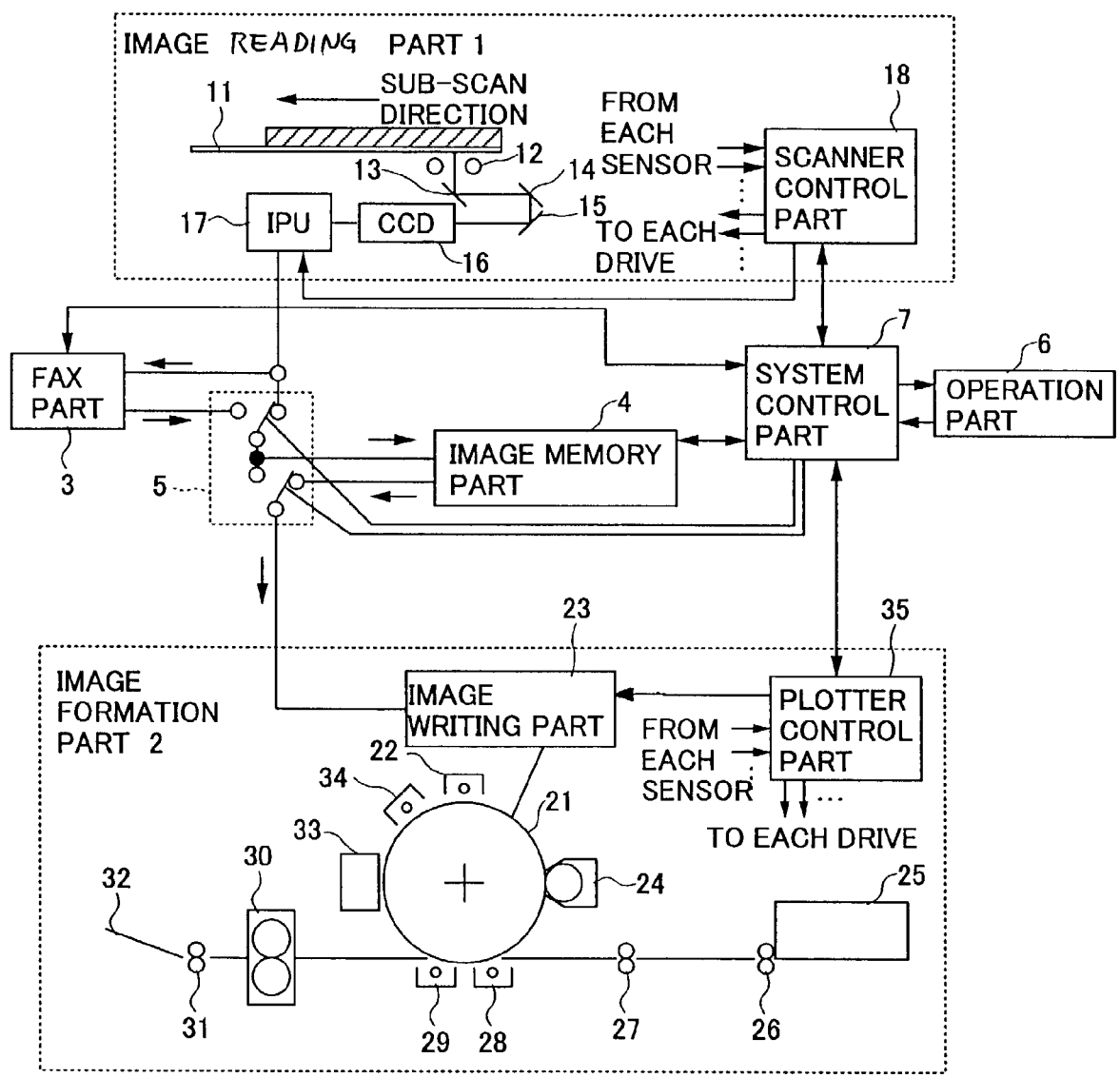
FIG. 2 illustrates a configuration of the digital copier as the image processing apparatus in each of the first and second embodiments of the present invention.
Figure 3:
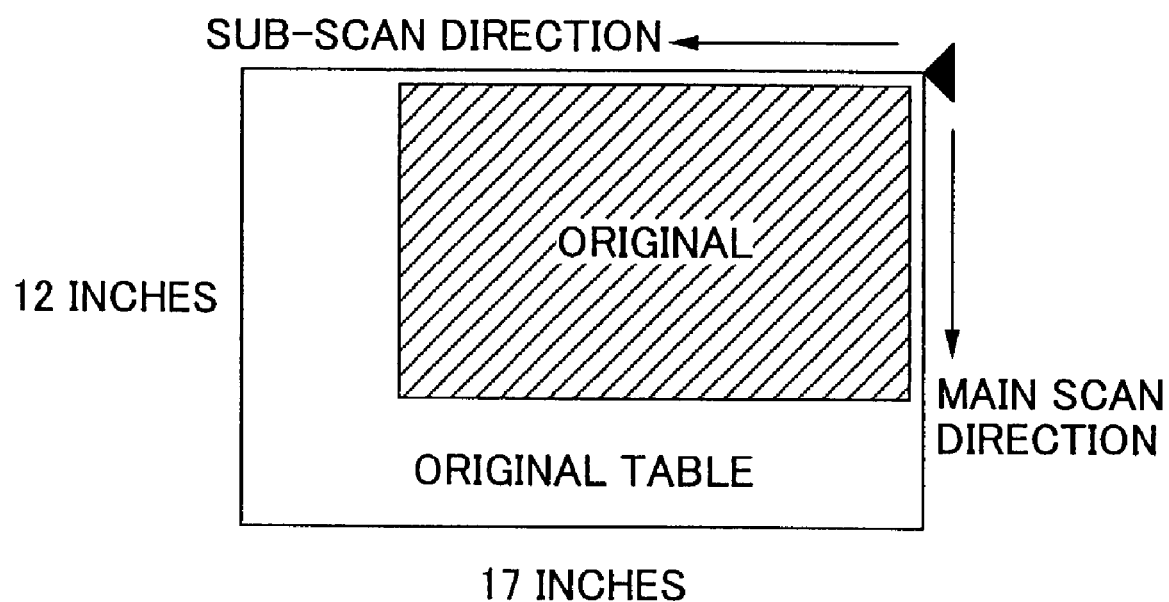
FIG. 3 shows a view of a contact glass of the digital copier of FIG. 2 viewed from the top.

FIG. 2 shows an example of a configuration of main parts of a digital copier as an image processing apparatus in a first embodiment of the present invention. FIG. 3 shows a view of a contact glass of this digital copier from upper viewed from the top.

This digital copier includes an image reading part 1, an image formation part 2, a FAX section 3, an image memory part 4, a selector part 5, an operation part 6, and a system control part 7, as shown.

First, an image reading process by the image reading part 1 in this digital copier and an image formation (printing) process by the image formation part 2 will now be described with reference to FIG. 2 and FIG. 3.

In this digital copier, by the image reading part 1 which is an image inputting device, an image of an original placed on the contact glass (original table) 11 is read optically, and it is changed into an electric signal. That is, scanning exposure of the image surface (undersurface) of the original on the contact glass 11 is carried out, and a reflected optical image from the image surface is made to be imaged onto a light-receiving surface of a CCD (image sensor) 16 through reflective mirrors 13 through 15 along with the contact glass 11 with an exposure lamp 12 which can move therealong.

Furthermore, photoelectric conversion of the thus-formed image is carried out by the CCD 16, and the electric signal according to the intensity of the light is acquired. Subsequently, by the image processing part (it will be referred to as "IPU" hereinafter) 17, while processing shading correction, etc. is performed on the electric signal, A/D conversion is performed on the signal concerned. Thus, an 8-bit digital signal is acquired. Furthermore, image processing, such as size-change processing, dithering processing or the like, is performed on this signal, and then, it is sent to the image formation part 2 with an image synchronization signal as image data (image signal).

The scanner control part 18 controls a drive part, such as a drive motor, according to a result of detection of operation by various sensors in order to perform the above process. Moreover, this control part 18 sets various parameters to IPU 17.

In the image formation part 2, a drum-shaped photo conductor 21 rotates at a predetermined rate by a motor which is not shown, and the surface (round side) of the photo conductor 21 is uniformly charged with an electrification charger 22. Then, the thus-electrified surface is exposed by laser light which is emitted from a laser diode of an image writing part 23 and which is modulated according to the image data, and thus, an electrostatic latent image is formed. Subsequently, the electrostatic latent image is developed by a toner by a development apparatus 24, and the toner image thus visualized is obtained.

A transfer paper in a feed tray 25 is fed therefrom and is conveyed by feed rollers 26 at a predetermined timing, and it stands at a position where the tip thereof is pinched with registration rollers 27. Timing with operation of the photo conductor 21 is controlled after that, the above-mentioned transfer paper is re-conveyed and electrostatic transfer of the above-mentioned toner image is made from the photo conductor 21 onto the transfer paper by a transfer charger 28. Furthermore, the transfer paper is then separated from the photo conductor 21 by a separation charger 29.

Then, thermal fixing of the toner image on the transfer paper is carried out by a fixing device 30, and then, the transfer paper is delivered to a delivery tray 32 by delivery rollers 31. A toner image which remains on the surface of the photo conductor 21 after the electrostatic transfer is removed by a cleaning device 33. Then, the surface of the photo conductor 21 after the toner image is removed is discharged by an electric discharge charger 34.

A plotter control part 35 controls a drive part, such as a drive motor, according to detection result by various sensors, in order to perform the above process.

Figure 4:
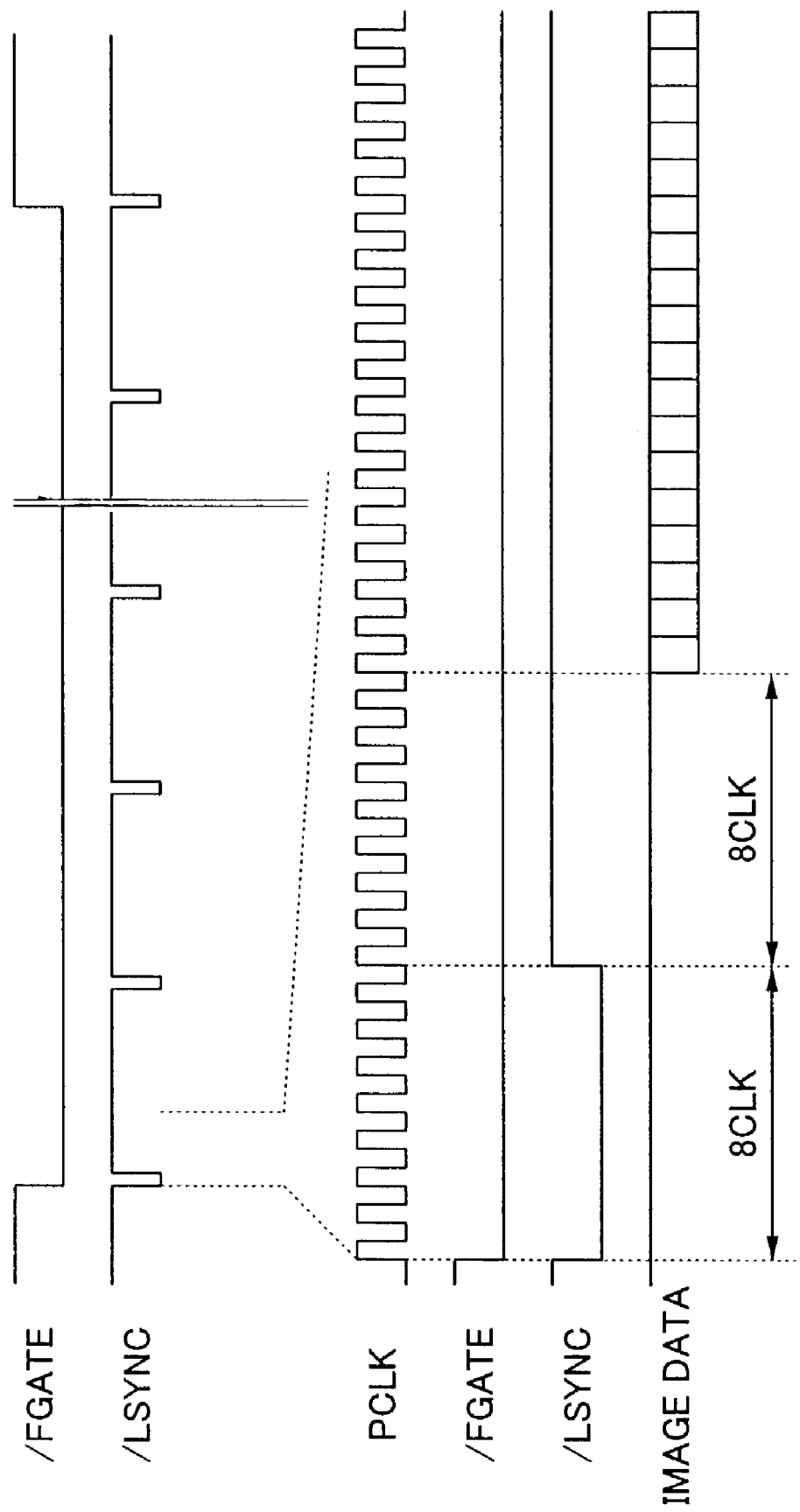
FIG. 4 shows a timing chart showing an example of image synchronization signals output by an IPU of the image reading part of FIG. 2.

The image synchronization signals output by the IPU 17 of the image reading part 1 will now be described with reference to FIG. 4.

A "/FGATE signal" ("/" shows low active) is a frame gate signal indicating an image effective range with respect to an image area along a sub-scanning direction for 1-page image data. This signal indicates the effectiveness of image signal while the signal has a low level. Moreover, this /FGATE signal is asserted or negated at a decaying edge of a line synchronization signal ("/LSYNC signal").

The "/LSYNC signal" is a signal asserted by a predetermined number of clock pulses at rising edges of a pixel synchronization signal ("PCLK signal"). The effectiveness of the image data along the main scanning direction is indicated after a predetermined number of clock pulses after the rising of this signal.

The image data sent to the image reading part is data of a predetermined range corresponding to one period of the PCLK signal. This predetermined range is a range measured from the arrow portion (upper right corner) of FIG. 3, and is the range obtained through division into 400 dpi along each of the main scanning direction and sub-scanning direction The image data is sent out as data in raster form starting from the arrow portion. Moreover, the effective range along the sub-scanning direction of this image data is usually decided by the transfer paper size.

The system control part 7 of FIG. 2 contains a microcomputer including a central processing unit, ROM and RAM. This system control part 7 detects inputting operation made by a user to the operation part 6, sets various parameters to the image reading part 1, the image memory part 4, the image formation part 2, and the facsimile section 3, and performs various control operations, such as issuing respective process execution instructions.

Moreover, the same part 7 displays a system (of the whole digital copier) state on the operation part 6.

Instructions to this system control part 7 are input by key operation performed by a user to the part 6.

The FAX section 3 has a function as an image input-and-output device. With instructions from the system control part 7, this section 3 performs 2 binary compression processing according to data transfer standard of G3 or G4 facsimile to image data (binary value image data) sent through the selector part 5 from the IPU 17 or the image memory part 4.

Then, this section 3 transmits this signal to an external apparatus (image processing apparatus which has a facsimile function, such as a facsimile apparatus) through a telephone line by using the data obtained after undergoing the compression, as facsimile data.

Moreover, this FAX section 3 performs binary decompression processing on facsimile data sent through the telephone line from an external apparatus, and restores it to binary image data. The binary image data is sent to the image writing part 23 of the image memory part 4 or the image formation part 2 through the selector part 5.

In the image writing part 23, modulation (ON/OFF) drive of the laser diode is performed by the writing control part according to the image data sent from the selector part 5. Thus, the corresponding laser light is emitted therefrom, and the polygon mirror deflects the laser light at a uniform velocity periodically. The deflected light then scans the electrified surface of the photo conductor 21 along the main scanning direction which rotates along the sub-scanning direction, and forms electrostatic latent image on the surface.

According to instructions from the system control part 7, the selector part 5 changes a self state and sends out the image data sent from the image reading part 1, the image memory part 4, or the FAX section 3 to the image formation part 2 or the image memory part 4.

The image memory part 4 acts as image storage, and usually stores the image data of the original input from the IPU 17. Then, the thus-stored image data is used by copying application software for carrying out copy processing in various styles, such as a repeat copy, a rotation copy, etc.

Moreover, a mechanism of this memory part 4 is carried out also as a buffer memory which stores binary image data from the FAX section 3 temporarily.

Instructions of inputting/outputting (reading/writing) of the image data are made by the system control part 7.

Figure 1:
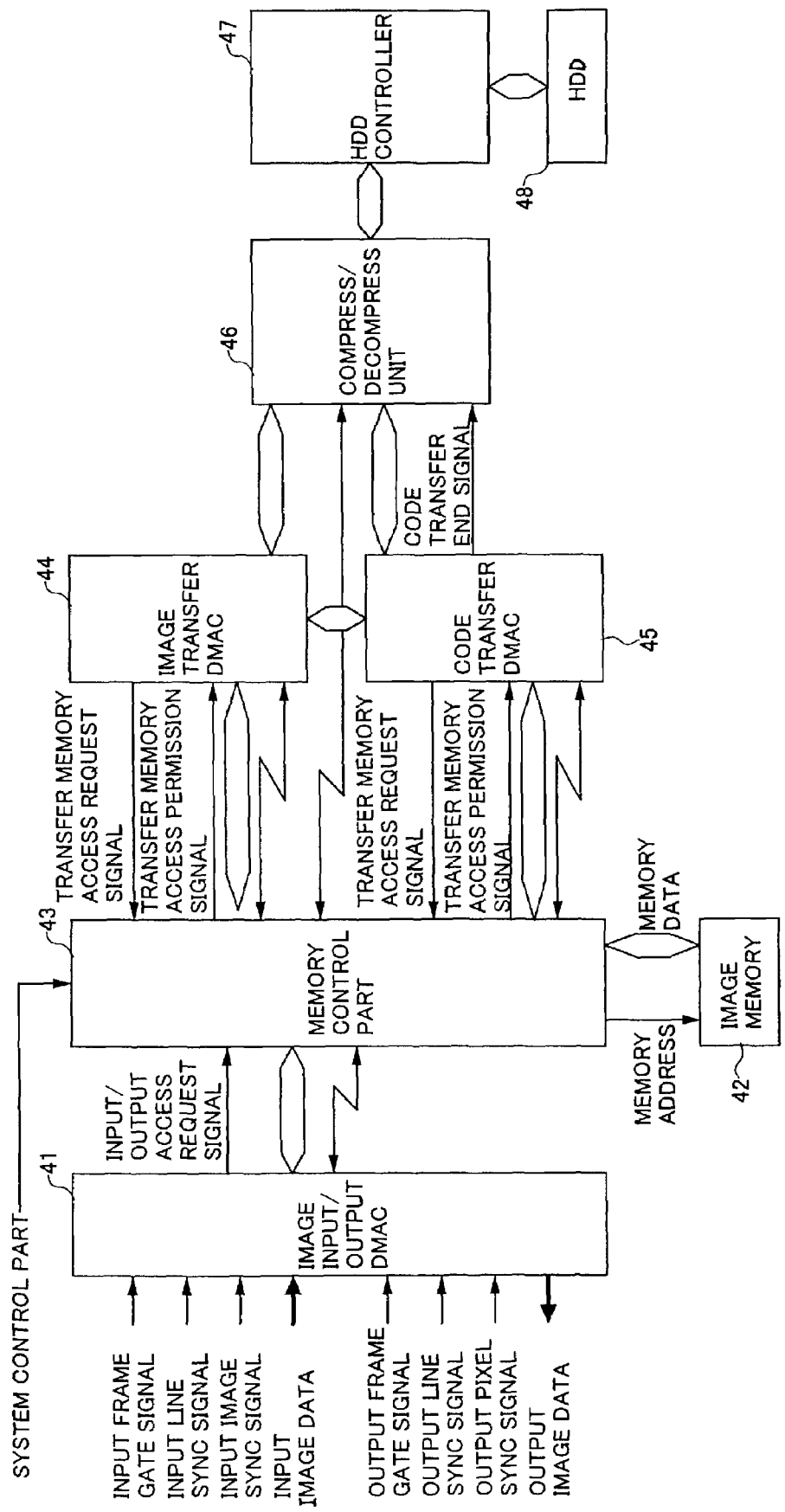
FIG. 1 shows a block diagram showing an example of configuration of an image memory part contained in a digital copier which is an image processing apparatus according to a first embodiment of the present invention.

FIG. 1 shows a block diagram showing an example of configuration of the image memory part 4 shown in FIG. 2.

This image memory part 4 contains an image input and output DMAC 41, an image memory 42, a memory control part 43, an image transfer DMAC 44, a code transfer DMAC 45, a compression/decompression unit 46, a HDD controller 47, and a HDD 48.

In addition, although not shown, the memory control part 43 and the HDD controller 47 are connected by an address bus and a data bus.

First, the image input and output DMAC 41 will now be described.

This image input and output DMAC 41 performs a function as a first data transfer part together with the memory control part 43. It includes a CPU (central processing unit, a microcomputer containing a ROM and a RAM), and a logic circuit. This DMAC 41 communicates with the memory control part 43, and receives instructions from the part 43. Then, according to the instructions, the DMAC 41 sets up various parameters into the memory control part 43, and controls data transfer between the image reading part 1 or the FAX section 3, and the image memory 42 (transfer of image data).

Namely, for example, when image input instructions are received from the memory control part 43, the DMAC 41 carries out packing of the image data (input image data) sent through the selector part 5 from the image reading part 1 or the FAX section 3 as memory data of a 8-pixel unit according to the input frame gate signal which includes the input image synchronization signal, input line synchronization signal, and input pixel synchronization signal The DMAC 41 outputs the memory data packed for 8 pixels at any time to the memory control part 43 with an address signal which includes an input-and-output access signal, and an input-and-output memory access request signal. Thus, the DMAC 41 transfers and writes the input image data in an ordinary image memory area later mentioned in the image memory 42. At this time, the DMAC 41 calculates the number of lines of the image data, and it outputs this count value to the memory control part 43 as a "number of input-and-output processed lines"

Furthermore, the DMAC 41 measures the data transfer rate of the image data, and outputs the measurement result to the memory control part 43 as "first data transfer rate"

Moreover, the DMAC 41 recognizes a progress state of the data transfer, and outputs the recognition result to the memory control part 43 as "first progress state".

Moreover, when image output instructions are received from the memory control part 43, the DMAC 41 controls the memory control part 43, and reads the image data written in the ordinary image memory area in the image memory 42.

Furthermore, the image data thus read is made synchronization with the output frame gate signals which include the output image synchronization signal, output line synchronization signal, and output pixel synchronization signal, and the DMAC 41 outputs them to the image formation part 2 or the FAX section 3 by means of the selector part 5.

This image input and output DMAC 41 transfers status information to the memory control part 43 in order to inform of the self state to the system control part 7.

Next, the image memory 42 will now be described.

The image memory 42 is a primary storage (semiconductor memory) for storing the image data, and includes semiconductor memory cells, such as DRAMs. The total storage capacity of this image memory 42 is 8 M bytes. This totals 4 M bytes of the memory area (ordinary image memory area) which stores binary image data for an A3 size by 400 dpi, and 4 M bytes of a memory area used as a memory for electronic sorting.

In addition, when code data which is image data after compression (data form conversion) needs to be stored temporarily, the memory control part 43 can secure a memory area ("compression image memory area") in the image memory 42 according to instructions from the system control part 7. In this case, the memory area except the ordinary image memory area is used in the image memory 42.

Next, the memory control part 43 will now be described.

It collaborates with the image input and output DMAC 41, the image transfer DMAC 44, the code transfer DMAC 45, and the HDD controller 47, and this memory control part 43 performs a function as "first transfer rate recognition part", "first progress state recognition part", "second transfer rate recognition, part", "second progress state recognition part", "transfer start timing determination part", "resource control part", and "exclusive control permission means."

The memory control part 43 includes a CPU and a logic circuit, communicates with the system control part 7, receives instructions, performs setting of parameters, and performs read-out and writing of image data from/to the image memory 42 according to the instructions.

There are various instructions, i.e., "image input instructions", "image output instructions", "image transfer instructions", "image compression instructions", and "image decompression instructions" as process execution instructions which are instructions of operation input into this memory control part 43 from the system control part 7.

Among them, for example, the "image input instructions" and "image output instructions" are transferred to the image input and output DMAC 41 from this memory control part 43, if needed, the "image compression instructions" and "image decompression instructions" are transferred to the image transfer DMAC 44, the compression/decompression unit 46, or the code transfer DMAC 45 from this memory control part 43, if needed, and "image transfer instructions" are transferred to the HDD controller 47 from the memory control part 43.

Furthermore, this memory control part 43 transfers those states to the system control part 7 as status information in order to send the state of itself and the image memory 42 to the system control part 7.

Furthermore, this memory control part 43 transfers it to the system control part 7 in response to receiving status information from the image input and output DMAC 41, the image transfer DMAC 44, the code transfer DMAC 45, and the compression/decompression unit 46.

This memory control part 43 can also perform the following processing. That is, when process execution instructions are received from the system control part 7, the data added to the instructions (for example, image input instructions) is analyzed. Then, the data transfer rate between the image input and output DMAC 41 and the image memory 42 (referred to as "first transfer rate") and the data transfer rate between the image memory 42 and the image transfer DMAC 44 (referred to as "second transfer rate") are recognized from the analysis result. The first transfer rate is recognized by analyzing the data, when "the first transfer rate" is received from the image input and output DMAC 41, and further, when "second transfer rate" is received from the image transfer DMAC 44, the second transfer rate is recognized by analyzing the data.

Moreover, this memory control part 43 recognizes the progress state (referred to as "first progress state") of the data transfer between the image input and output DMAC 41 and the image memory 42 by analyzing the data, when "first progress state" data is received from the image input and output DMAC 41. Moreover, when "second progress state" data is received from the image transfer DMAC 44, the progress state (referred to as "second progress state") of the data transfer between the image memory 42 and the image transfer DMAC 44 is recognized by analyzing the data.

Next, the image transfer DMAC 44 will now be described.

This image transfer DMAC 44 also include CPU and logic circuit, communicates with the memory control part 43, receives instructions from this part 43, and controls the data transfer between the image memory 42 and the compression/decompression unit 46 by setup of parameters into the memory control part 43 according to the instructions.

For example, when image compression instructions are received from the memory control part 43, "transfer memory access request signal" is output to the memory control part 43. Then, when the transfer memory access permission signal from the memory control part 43 becomes active, the memory control part 43 reads the image data from the ordinary image memory area in the image memory 42.

Then, this read-out data is transferred to the compression/decompression unit 46, and compression processing is performed. At this time, the DMAC 44 counts the number of lines of the image data output to the memory control part 43, then, this count value is referred to as the number of transfer processed lines. Furthermore, the data transfer rate is measured and it is output to the memory control part 43 as the measurement result is refereed to as transfer rate data.

Furthermore, the progress state of the data transfer is recognized and it is output to the memory control part 43 as transfer progress state data.

This DMAC 44 outputs a "transfer memory access request signal" to the memory control part 43, when image decompression instructions are received from the memory control part 43. Then, when a "transfer memory access permission signal" from the memory control part 43 becomes active, DMAC 44 controls the image data from the compression/decompression unit 46 and the memory control part 43 which then writes the processing result into the ordinary image memory area of the image memory 42.

This image transfer DMAC 44 transfers the state to the memory control part 43 as status information in order to send the self state to the system control part 7.

Next, the code transfer DMAC 45 will now be described.

This code transfer DMAC 45 includes CPU and logic circuit, communicates with the memory control part 43, receives instructions from this part 43, sets up parameters according to the instructions, and performs data transfer between the compression/decompression unit 46 and HDD 48 which is further controlled by the HDD controller 47. The data transfer between the image memory 42 and the compression/decompression unit 46 is also controlled thereby.

This DMAC 45 determines the transfer destination by analyzing the data added to the instructions, when image compression instructions (the data in which the transfer destination is indicted is added thereto) received from the memory control part 43. Then, when the transfer destination is HDD 48, the code data which is image data after the compression processing with the compression/decompression unit 46 is transferred and written into the HDD 48 by the HDD controller 47.

At this time, the DMAC 45 calculates the data amount (the amount of code data), and recognizes the amount of data after compression from the calculation result.

When the transfer destination is the compression image memory area in the image memory 42, the DMAC 45 outputs a "transfer memory access request signal" to the memory control part 43. Then, when a "transfer memory access permission signal" from the memory control part 43 becomes active, the memory control part 43 is controlled thereby, and the code data which is image data after the compression processing with the compression/decompression unit 46 is transferred and written into the compression image memory area in the image memory 42.

At this time, the DMAC 45 calculates the amount of code data, and outputs the result to the memory control part 43 as the amount of data compressed.

Moreover, the progress state of data transfer (writing to the "compression image memory area") can be recognized, and it can also be output to the memory control part 43 by using the recognition result as progress state data.

The DMAC 45 determines a transfer source by analyzing the data added to the instructions, when image decompression instructions (the data in which the transferring source is indicated is added thereto) is received from the memory control part 43. Then, when the transfer source is the HDD 48, the code data from the HDD controller 47 is transferred to the compression/decompression unit 46.

When the transferring source is the "compression image memory area" in the image memory 42, the DMAC 45 controls the memory control part 43 which then outputs "transfer memory access request signal". Then, when the "transfer memory access permission signal" from the memory control part 43 becomes active, the memory control part 43 is controlled thereby, and the code data is read from the compression image memory area in the image memory 42. Then, the read-out data is transferred to the compression/decompression unit 46.

This code transfer DMAC 45 transfers the state to the memory control part 43 as status information in order to send them self state to the system control part 7.

Next, the compression/decompression unit 46 will now be described.

This compression/decompression unit 46 includes CPU and logic circuit, communicates with the memory control part 43, receives instructions, and sets parameters according to the instructions. This unit 46 performs compression processing of compressing image data and changes it into code data (in data form), and decompression processing of reverse-change so that the code data is decompressed, is returned to the original image data.

That is, when image compression instructions are received from the memory control part 43, coding processing (compression processing) of MH, MR, MMR, etc. is performed, and image data (binary data) from the image transfer DMAC 44 is coded (compressed). At this time, the processing rate (or speed; conversion rate (or speed) of the data form of image data) is recognized.

When image decompression instructions are received from the memory control part 43, this compression/decompression unit 46 performs reverse processing of MH, MR, or MMR, decompresses (decodes), and returns the image data from the code transfer DMAC 45 into the original image data.

The compression/decompression unit 46 sends a state to the memory control part 43 as status information in order to send the self state to the system control part 7.

Next, the HDD controller 47 will now be described.

This HDD controller 47 includes CPU and logic circuit, communicates with the memory control part 43, receives instructions, and sets parameters according to the instructions. Furthermore, it performs state (status) detection of HDD 48. Moreover, the data transfer between the compression/decompression unit 46 and HDD 48 is controlled by the HDD controller 47. Furthermore, the data transfer between the image memory 42 and HDD 48 is controlled thereby through the memory control part 43.

Next, HDD 48 will now be described.

HDD 48 is a secondary storage (mass storage device) for saving the image data (including the code data which is image data after the compression processing by the compression/decompression unit 46) previously memorized by the image memory 42. The image data from the HDD controller 47 is written into and is saved, according to the instructions from the HDD controller 47, into an internal hard disk (HD). The image data saved in the hard disk is read out, and it is sent out to the HDD controller 47.

In addition, HDD 48 and HDD controller 47 may be replaced by other secondary storage (mass storage device) and its controller, such as an optical disk drive and its controller, or the like.

Figure 5:
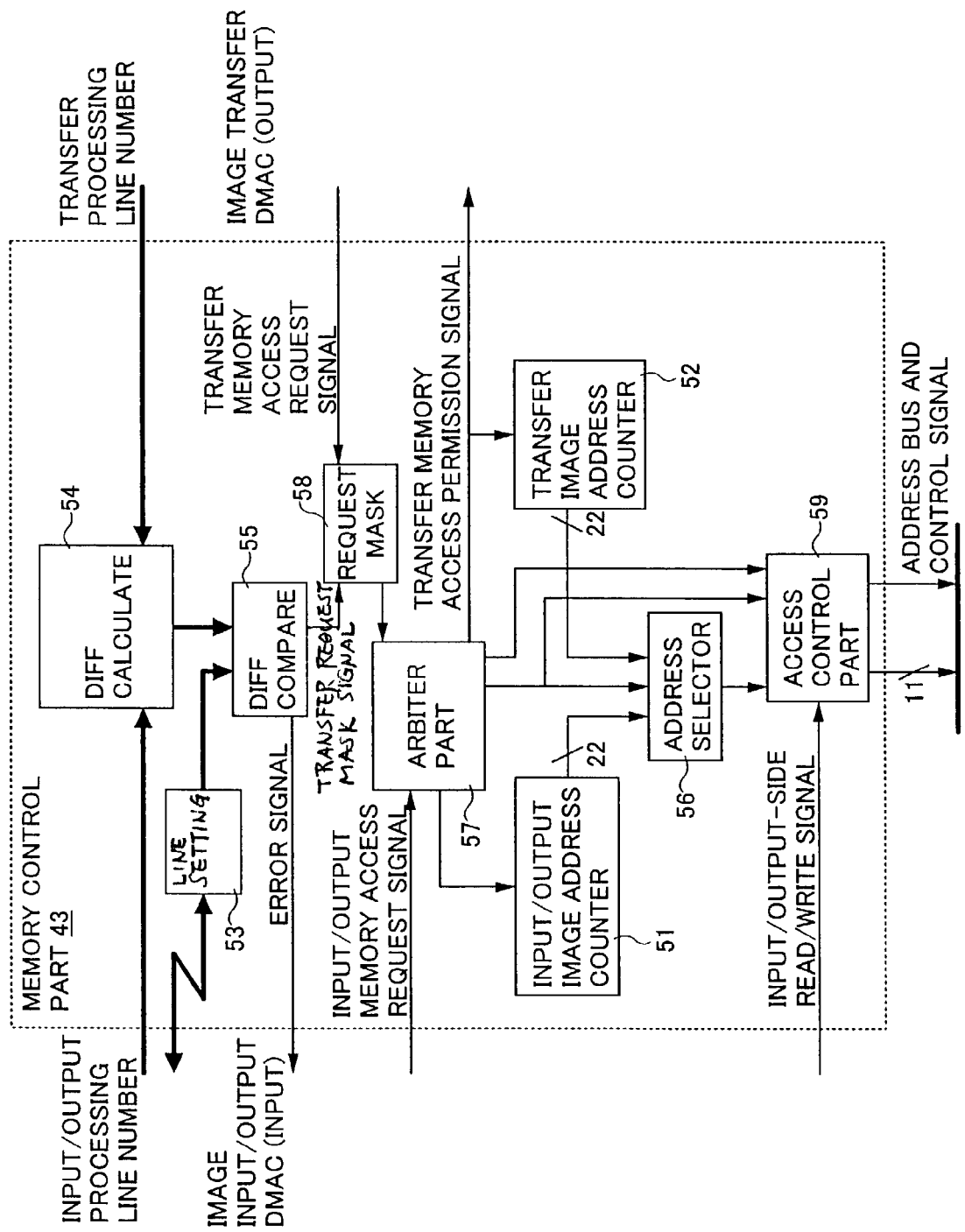
FIG. 5 shows a block diagram showing an example of configuration of an address generating part and a comparison part of a memory control part of FIG. 1.

FIG. 5 shows a block diagram showing an example of a configuration of an address generating part, and a comparison part, in the memory control part 43.

The memory control part 43 includes an input-and-output image address counter part 51, a transfer image address counter part 52, a line setting part 53, a difference calculation part 54, a difference comparison part 55, an address selector part 56, an arbiter part 57, a request mask part 58, and an access control part 59.

Functions of each block of the memory control part 43 will now be described.

First, the input-and-output image address counter part 51 will now be described.

This input-and-output image address counter part 51 is an address counter counted up according to an "input-and-output memory access request signal" from the image input and output DMAC 41. Then, a 22-bit memory address which shows a storage place of the input-and-output image data (image data from the image input and output DMAC 41 or image data to the image input and output DMAC 41) is output. That is, in writing the image data from the image input and output DMAC 41 in the image memory 42, it writes the data in and outputs the address. In reading the image data to the image input and output DMAC 41 from the image memory 42, it reads the data and outputs the address. Those memory addresses are once initialized at a time of access start to the image memory 42.

Next, the transfer image address counter part 52 will now be described.

This transfer image address counter part 52 is an address counter counted up according to a transfer memory access permission signal from the arbiter part 57 mentioned later. Then, a 22-bit memory address which shows a storage place of transfer image data (image data from the image transfer DMAC 44 or the code transfer DMAC 45, image data to the image transfer DMAC 44, or the code transfer DMAC 45) is output therefrom.

That is, in writing the image data from the image transfer DMAC or the code transfer DMAC in the image memory 42, it writes the data therein and outputs the address. In reading the image data to the image transfer DMAC, or the code transfer DMAC from the image memory 42, it reads the data therefrom and outputs the address.

Those memory addresses are once initialized at the time of the access start to the image memory 42.

Next, the line setting part 53 will now be described.

This line setting part 53 functions as a buffer at a time of image data input (writing). Namely, in a case where the image memory (semiconductor memory) 42 is used, the line setting part 53 set a value according to instructions by the system control part 7 to be used for comparison with a line number difference between the number of input processing lines and the number of transfer processing lines which is output from the difference calculation part 54. The comparison is made by the difference comparison part 55. In this case, it is possible to set up an arbitrary value.

Next, the difference calculation part 54 will now be described.

This difference calculation part 55 subtracts, at a time of image input, the number of input-and-output processing lines which the image input and output DMAC 41 outputs from the number of transfer processing lines with which the image transfer DMAC 44 outputs. Then, the difference calculation part 54 outputs the subtraction result to the difference comparison part 55 as the line number difference.

Next, the difference comparison part 55 will now be described.

This difference comparison part 55 compares, at a time of data input, the line number difference from the difference calculation part 54 with the setting value from the line setting part 53. Then, when the line number difference and the setting value are in agreement, an error signal is outputted to the system control part 7. When the line number difference has a value "0", "transfer request mask signal" to the request mask part 58 is made active (that is, the "transfer request mask signal" is output to the request mask part 58).

In a case where the line number difference and the setting value are not in agreement, and, also, the line number difference is other than "0", or when input-and-output operation of image data is not performed, a "transfer request mask signal" to the request mask part 58 is not made active.

Next, the address selector part 56 will now be described.

With the control signal from the arbiter part 57, this address selector part 56 chooses the memory address from the input-and-output image address counter part 51, or the memory address from the transfer image address counter part 52, and outputs it.

Next, the arbiter part 57 will now be described.

This arbiter part 57 outputs "transfer memory access permission signal" for accessing the image transfer DMAC 44 or code transfer DMAC 45, in case the "transfer memory access request signal" from the request mask part 58 is active, and, also, the "input-and-output memory access request signal" from the image input and output DMAC 41 is non-active.

Moreover, the input-and-output image address counter part 51 is made to count up according to the "input-and-output memory access request signal" from the image input and output DMAC 41. Moreover, the transfer image address counter part 52 is made to count up according to the "transfer memory access permission signal" from the arbiter part 57. At this time, an access start signal which is a trigger signal which shows start of memory access is output to the access control part 59.

Next, the request mask part 58 will now be described.

This request mask part 58 responds to activation of the "transfer request mask signal" from the difference comparison part 55, and puts a mask on (or disenables) the "transfer memory access request signal" from the image transfer DMAC 44 or the code transfer DMAC 45. Consequently, the data transfer processing to the image transfer DMAC 44 or the code transfer DMAC 45 from the image memory 42 is stopped.

Next, the access control part 59 will now be described.

This access control part 59 divides the memory address (physical address) input from the input-and-output image address counter part 51 or the transfer image address counter part 52 into "row address" and "column address" corresponding to the image memory 42 (for example, DRAM) which is a semiconductor memory according to the control signal from the arbiter part 57. Then, the address data is output to an 11-bit address bus one by one thereby.

Moreover, this access control part 59 outputs DRAM control signals (RAS, CAS, WE) according to the access start signal from the arbiter part 57. The memory control part 43 is initialized with the image input instructions from the system control part 7, and enters a waiting state for image data. Then, when image data read by image reading operation of the image reading part (scanner) 1, for example, is input from the image input and output DMAC 41, the image data is once written in the ordinary image memory area in the image memory 42.

At this time, the image input and output DMAC 41 counts the number of lines of image data, and outputs the count result to the memory control part 43 as the number of input-and-output processing lines.

On the other hand, the image transfer DMAC 44 outputs a "transfer memory access request signal" to the memory control part 43, when the image compression instructions are received from the system control part 7 through the memory control part 43.

At this time, in the memory control part 43, since the mask is put on the "transfer memory access request signal" by the request mask part 58, the access control part 59 does not perform access to the image memory 42. When image data of one line from the image input and output DMAC 41 is processed, the mask of the "transfer memory access request signal" is removed. Consequently, the access control part 59 accesses the image memory 42, reads image data from the "ordinary image memory area", and transfers the image data to the compression/decompression unit 46 by control of the image transfer DMAC 44.

The image transfer DMAC 44 responds to the input of the image data from the memory control part 43, counts the number of lines of the image data, and outputs the count result to the memory control part 43 as the number of transfer processing lines.

In the memory control part 43, the difference calculation part 54 subtracts the number of input-and-output processing lines output from the image input and output DMAC 41 from the number of transfer processing lines output from the image transfer DMAC 44. Then, the subtraction result is output as the line number difference to the difference comparison part 55. The difference comparison part 55 puts a mask on the "transfer memory access request signal" from the image transfer DMAC 44 when the line number difference has a value of "0", and the data transfer processing to the image transfer DMAC 44 from the image memory 42 is stopped. Consequently, passing by of the memory address is prevented.

That is, it is prevented that the memory address output from "transfer image address counter part" 52 becomes larger than the memory address output from "the input-and-output image address counter part 51." That is, it is prevented that the data transfer to HDD 48 from the image memory 42 passes by the data transfer to the image memory 42 from the image reading part 1.

Figure 6:
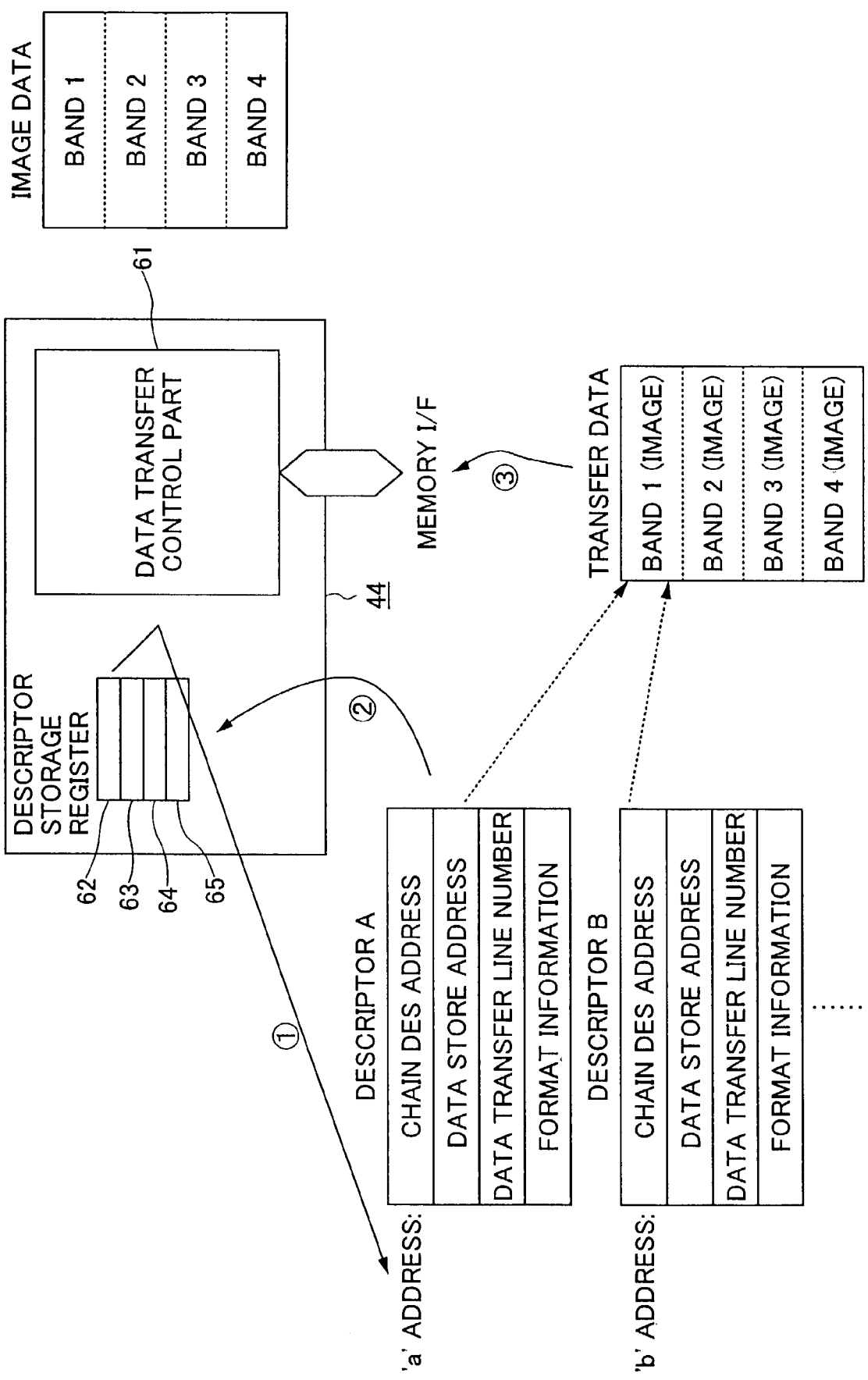
FIG. 6 illustrates calculation of transfer processing of image data and processing of calculating the number of lines of image data by an image transfer DMAC of FIG. 1.

Next, transfer processing of the image data based on the image transfer DMAC 44, and counting of the number of lines of image data will now be described in detail with reference to FIG. 6.

The image transfer DMAC 44 divides into a plurality of bands (in this example, four bands) the image data of an amount of predetermined data (for example, a page of image data) stored in the ordinary image memory area in the image memory 42, and transfers it to the compression/decompression unit 46. For this reason, four descriptor storing registers 62 through 65 are provided other than the data transfer control part 61 using CPU.

The data transfer control part 61 in the image transfer DMAC 44 is started when image compression instructions are received through the memory control part 43 from the system control part 7. Then, a chain point address 'a' beforehand set by the system control part 7 is read into the descriptor storing register 62 at the top of the respective descriptor storing registers 62 through 65. Then, read access is made onto the descriptor 'A' stored in the place indicated by the chain point address 'a' in a memory (RAM or a non-volatility memory), not shown, of the memory control part 43. Then, the contents of the descriptor A are read, are loaded and written into the top descriptor storing register 62.

The contents of the descriptor A loaded to the descriptor storing register 62 includes 4 words. The contents thereof are as follows:

(1) The chain point address which indicates the storage address of the following descriptor (it becomes the descriptor B in this case);

(2) The data storing address which indicates the top address of the image data (division data) transferred using the descriptor A (data read-out)

(3) The number of data transfer lines which indicates the amount of data of the image data transferred using the descriptor A; and (4) The format information which indicates whether CPU interruption is generated when transfer of the image data for the above-mentioned data transfer lines is completed In addition, each the descriptors B through D (C and D being not shown) is also the same configuration as the descriptor A. The least significant bit of the above-mentioned format information is a bit indicating whether or not CPU interruption is generated after the data transfer for the data transfer lines is completed. The data transfer control part 61 in the image transfer DMAC 44 detects the least significant bit of this format information, and, when the least significant bit is "0", "CPU interruption" is generated, and when it is "1", masking of "the CPU interruption" is performed.

After the data transfer control part 61 in the image transfer DMAC 44 loads the contents of the descriptor A onto the descriptor storing register 62, it reads the chain point address 'b' which indicate the storing address of the following descriptor B from the descriptor A, and carries out read access onto the descriptor B stored in the place which the "chain point address b" in the memory of the memory control part 43 indicates, by the memory control part 43 Then, the contents of the descriptor B are read, are loaded onto the following descriptor storing register 63, and these contents are written therein.

Then, similarly to the above, the contents of the descriptor C are loaded onto the descriptor storing register 64, and the contents of the descriptor D are further loaded onto the descriptor storing register 65.

Then, when the least significant bit of the format information on each of all the descriptors A, B, C, and D assumes to have a value "0", whenever transfer of the image data on one band is completed, CPU interruption occurs. Thereby, calculation of the number of lines for the processed image data can be carried out by adding the number of data transfer lines of each of the descriptors A, B, C, and D, one by one, at the CPU interruption generation.

Thereby, it becomes possible to detect the transfer end timing of the image data of the above-mentioned amount of predetermined data.

In addition, when each of the image input and output DMAC 41, the code transfer DMAC 45, and the HDD controller also has the same circuit configuration as the above-mentioned image transfer DMAC 44 and performs the same control as describe above, it becomes possible to carry out calculation of the number of lines of the image data of the amount of predetermined data.

Moreover, in the above-mentioned example, it is made to carry out read access onto the descriptor stored in the place which each chain point address in the memory of the memory control part 43 indicates, respectively. However, other than that, places indicated by the respective chain point addresses may be secured beforehand as "descriptor memory areas" on the image memory 42, and the contents of the descriptor stored in each of that descriptor memory area may be read one by one, and the contents may be loaded onto the corresponding descriptor storing register.

Next, an example of the transfer rate recognition processing by the memory control part 43 will now be described.

The data transfer rate from the image reading part 1 to the image memory 42, i.e., the first transfer rate (data transfer rate between the image input and output DMAC 41 and the image memory 42) is determined by the reading rate of the image reading part 1, and it depends on the hardware of the image reading part 1.

By communication with the image reading part 1, the system control part 7 acquires the reading rate of the image reading part 1, regards the reading rate as the first transfer rate, and adds the data indicating this first transfer rate to the process execution instructions to be transferred to the memory control part 43 of the image memory part 4.

Thereby, the memory control part 43 can recognize the first transfer rate by analyzing the data added to the instructions, when the process execution instructions are received from the system control part 7.

On the other hand, the data transfer rate from the image memory 42 to HDD 48, i.e., the second transfer rate (data transfer rate between the image memory 42 and the image transfer DMAC 44) depends on the writing rate for HDD 48.

In this embodiment, in an internal memory, a data table is prepared beforehand indicating each model name and corresponding writing rate on various types of HDDs which can be used by this system, with an operation signal input by key operation on the operation part 6. Then, by communication with the HDD controller 47, the system control part 7 acquires the model name of HDD 48 at a time of an initial setup of the system, and acquires the writing rate of HDD 48 by referring to the above-mentioned data table.

Then, the writing rate is regarded as the second transfer rate, and the data indicating this second transfer rate is also added to the process execution instructions to be transferred to the memory control part 43. Therefore, the memory control part 43 can recognize the second transfer rate by analyzing the data added to the instructions, when the process execution instructions are received from the system control part 7.

Next, another example of the transfer rate recognition processing by the memory control part 43 and an example of the transfer rate measurement processing by the image input and output DMAC 41 and the image transfer DMAC 44 will now be described with reference to FIG. 7 and FIG. 8.

Figure 7:
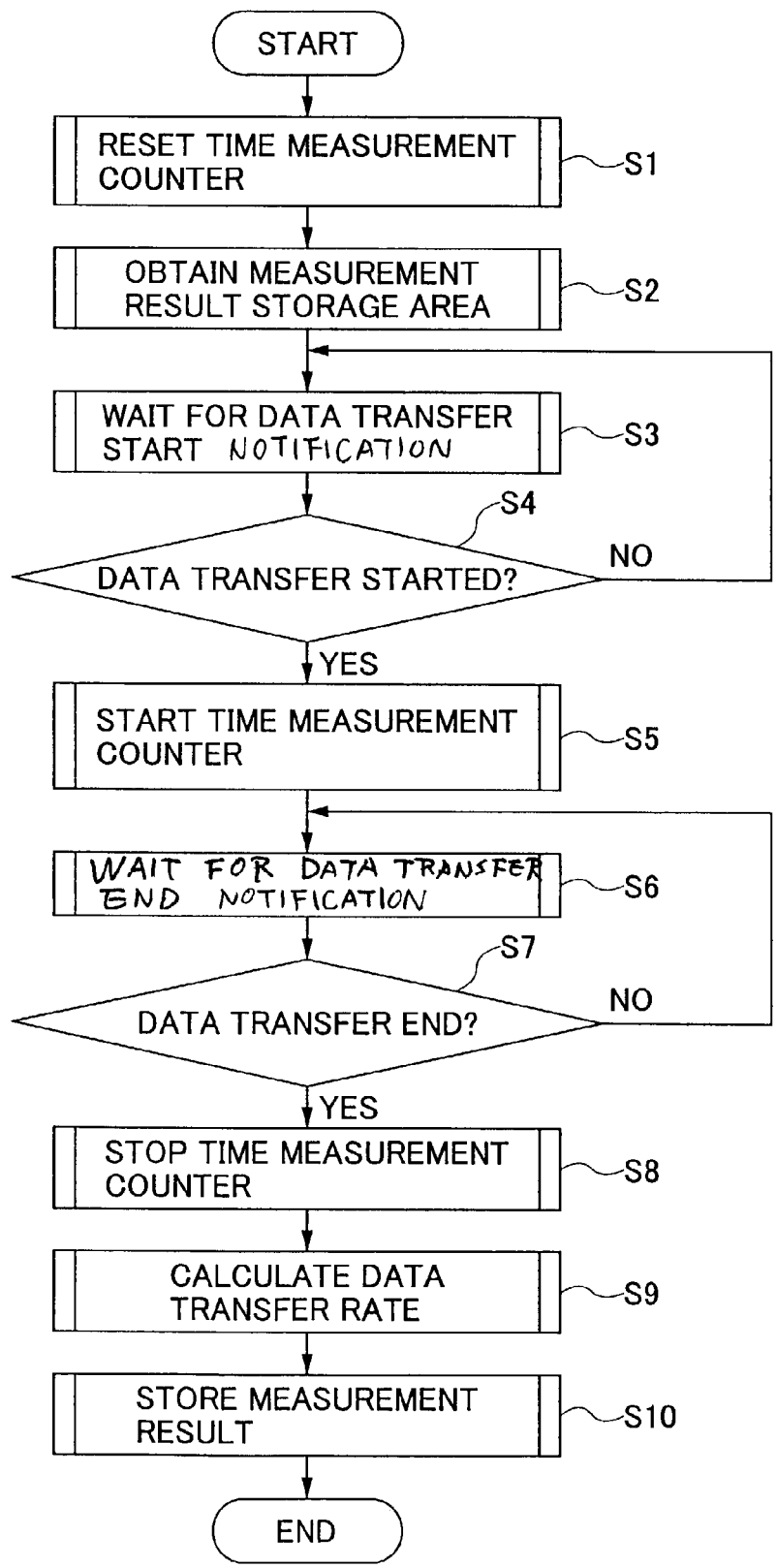
FIG. 7 shows a flow chart showing an example of transfer rate measurement processing performed by an image input and output DMAC and the image transfer DMAC shown in FIG. 1.

FIG. 7 is a flow chart which shows an example of the transfer rate measurement processing by the image input and output DMAC 41 and the image transfer DMAC 44.

FIG. 8 illustrates an example of an image for the transfer rate measurement instructions displayed on a character display unit with a touch panel provided on the operation part 6.

When the instructions for measurement of data transfer rate are given (ON key of "MEMORY DATA TRANSFER RATE MEASUREMENT" of FIG. 8 being pressed) by key operation on the operation part 6 (exterior), and thus, instructions for measurement of data transfer rate are received via the memory control part 43 from the system control part 7, the image input and output DMAC 41 or the image transfer DMAC 44 starts processing according to FIG. 7.

A time measurement counter is reset (in a step S1), and a measurement result preservation area is secured in a memory which is not shown (in a step S2), and a notice of a data transfer start from the memory control part 43 is waited for (in a step S3). At this time, the least significant bit of the format information on the corresponding descriptor memorized by the internal memory is set as "0" so that CPU interruption may occur at the time of data transfer (for example, 1 byte of data transfer) ends.

Then, transfer of data (image data prepare for transfer rate measurement input from the image reading part 1, or data previously set for transfer rate measurement) is started, and the notice of data transfer start is received from the memory control part 43 (Yes of in a step S4), and, thereby, time measurement by the time measurement counter is started (in steps S5 and S6). Then, after data transfer end is detected by CPU interruption (Yes of in a step S7), the time measurement by the time measurement counter is stopped (in a step S8), and the data transfer rate is calculated (in a step S9).

For example, assuming that 'line' denotes the number of lines to be transferred, while 'time' denotes the measured time (count value) measured by the time measurement counter, the data transfer rate 'trans_speed' is calculated by the following formula:

$$trans\_speed = line/time$$

When calculation of the data transfer rate trans_speed is completed, data indicating the calculation result is saved into the measurement result preservation area in the memory (in a step S10), and the processing of FIG. 7 is finished.

The data saved in the "measurement result preservation area" in the memory is output to the memory control part 43 at a predetermined timing (the image input and output DMAC 41 regards this result as "the first transfer rate data", and while the image transfer DMAC 44 regards this result as "second transfer rate data", respectively).

Thus, the memory control part 43 can recognize the first transfer rate by analyzing the data, when "the first transfer rate data" is received from the image input and output DMAC 41. Similarly, when "the second transfer rate data" is received from the image transfer DMAC 44, the second transfer rate can be recognized by analyzing the data.

In addition, the transfer rate measurement processing by the image input and output DMAC 41 or the image transfer DMAC 44 described above can also be made to start automatically at a time of input of the image data from the image reading part 1 (or the Fax section 3). In this case, "the data for transfer rate measurement" set up beforehand is not used, but a part of image data input from the image reading part 1 (or the FAX section 3) is used, and "transfer rate measurement processing" can thus be performed therewith.

Next, recognition processing of the progress state of the data transfer by the image input and output DMAC 41 and the image transfer DMAC 44 will now be described with reference to FIG. 9.

Figure 9:
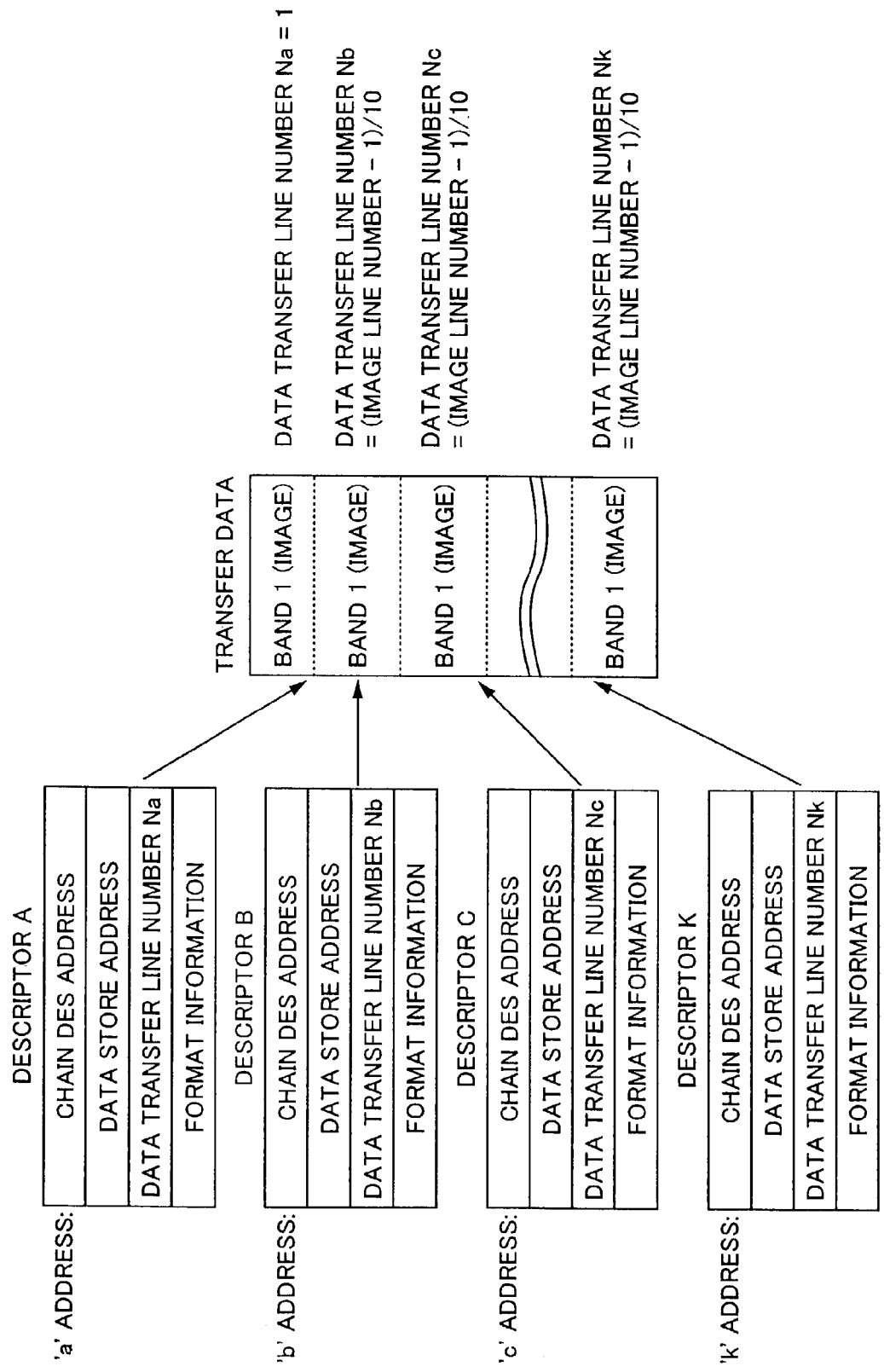
FIG. 9 illustrates recognition processing for progress state of the image input and output DMAC and image transfer DMAC according to the present invention.

FIG. 9 illustrates the recognition processing of the progress state of the data transfer by the image input and output DMAC 41 and the image transfer DMAC 44.

The image input and output DMAC 41 divides the descriptor used by the image input and output DMAC 41 for a plurality of bands (in this example, 11 bands) of the transfer data to be transferred from the image reading part 1 to the image memory 42, as shown in FIG. 9, in order to recognize the progress state of data transfer, for example. Then, the number Na of data transfer lines of the descriptor A for the first band (the number of division lines) is set as "1".

Furthermore, for each the second, third, ..., eleventh bands of transfer data, each the numbers Nb, Nc, ..., Nk of data transfer lines of the descriptors B, C, ..., K is set up as follows. That is, the remaining number of data transfer lines (the number obtained through subtraction of "1" from the total number of lines for a predetermined set of image data, for example, a page of data) being then divided by ten. Furthermore, the least significant bit of the format information of the descriptor A, B, C, ..., or K for each of the first, second, third, ..., eleventh bands of transfer data is set a's "0" (so that CPU interruption occurs). In addition, the above-mentioned total number of lines shall be beforehand specified by the system control part 7 here.

By such setup, the image input and output DMAC 41 can acquire the number of data lines transferred until the present time based on the number of data transfer lines of the descriptor corresponding to the band of image data each time of occurrence of CPU interruption caused by the data transfer of the relevant band of transfer data being finished. Thereby, the progress state of transfer of image data can be recognized with the number of transfer lines.

For example, assuming that 'sum$_{13}$ line' denotes the accumulated number of lines transferred until the present time, and 'all_line' denotes the total number of lines of the data which should be transferred, the progress state 'trans_rate' of data transfer can be obtained by the following formula.

$$trans\_rate = sum\_line/all\_line$$

In the example of FIG. 9, the progress state of the data transfer to the image memory 42 from the image reading part 1 can be recognized by ten divisions. The progress rate of the data transfer from the image reading part 1 to the image memory 42 can be recognized more finely by increasing the number of divisions of the above-mentioned descriptor.

Similarly, the image transfer DMAC 44 can also recognize the progress state at a time of carrying but data transfer from the image memory 42 to HDD 48 through the compression/decompression unit 46, as a result of the descriptor which the image transfer DMAC 44 uses is divided for 11 bands of relevant transfer data. Then, similarly, the number Na of data transfer lines of the descriptor A for the first band is set up with "1." Furthermore, for each of the second, third, ..., eleventh bands, each of the numbers Nb, Nc, ..., Nk of data transfer lines of each of the descriptors B, C, ..., K for the 11th band is set as the value obtained by dividing by ten the remaining number of image lines after subtraction of "1" from the total number of transfer data lines. Furthermore, similarly, the least significant bit of the format information of each descriptor A, B, C, ..., or K for the respective band is set as "0" (such that CPU interruption occurs).

By this setup, also the image transfer DMAC 44 can recognize the progress state of the data transfer to HDD 48 through the compression/decompression unit 46 from the image memory 42 by ten divisions. In addition, recognition of the same from the image memory 42 to HDD 48 at higher accuracy by increasing the number of divisions of the above-mentioned descriptor.

Next, various types of processing by the memory control part 43, the image input and output DMAC 41, and the image transfer DMAC 44 will now be described with reference to FIGS. 10 through 13.

Figure 10:
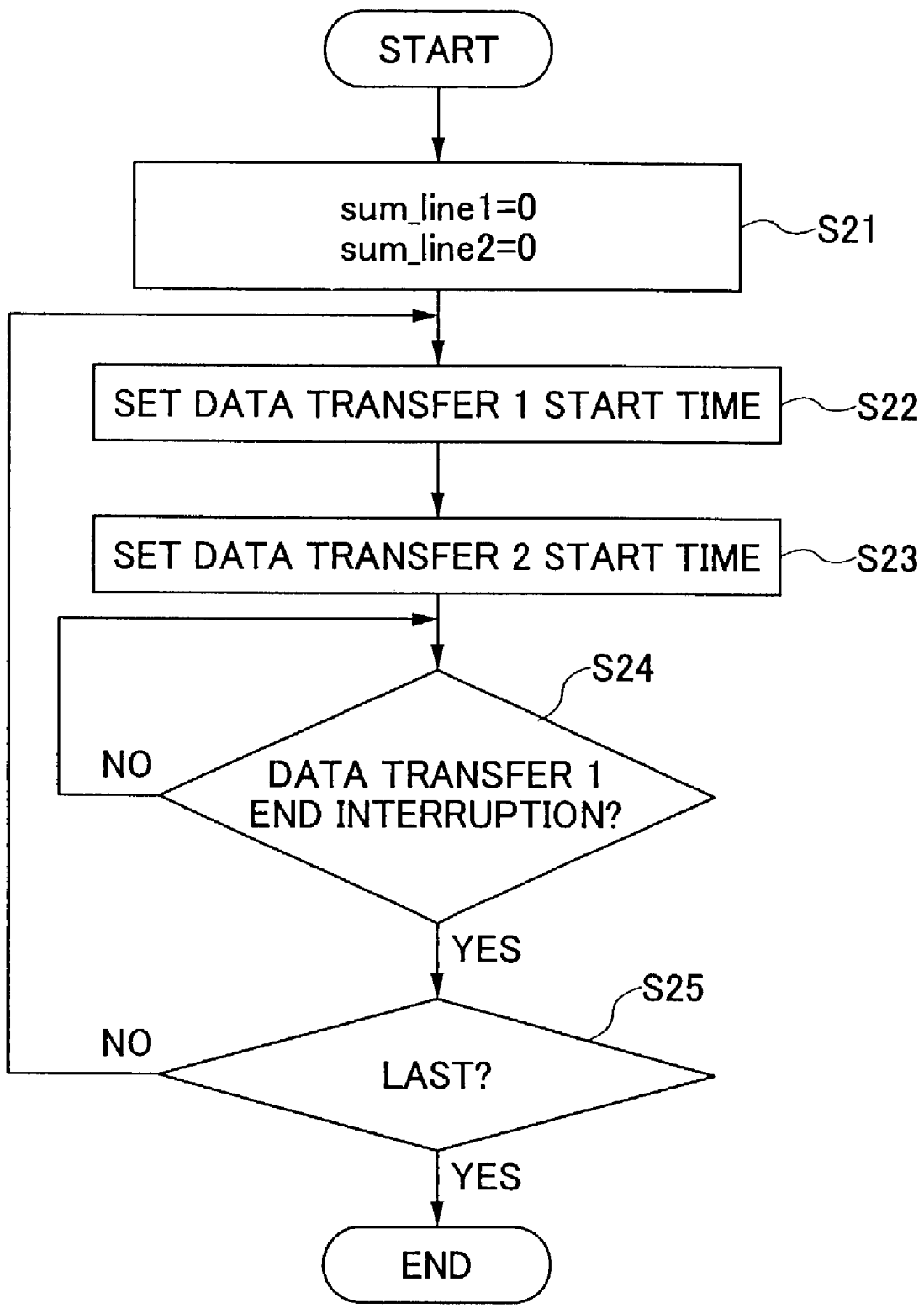
FIG. 10 shows an example of transfer start timing determination processing by the memory control part of FIG. 1.

FIG. 10 is a flow chart which shows an example of transfer start timing determination processing by the memory control part 43.

Figure 11:
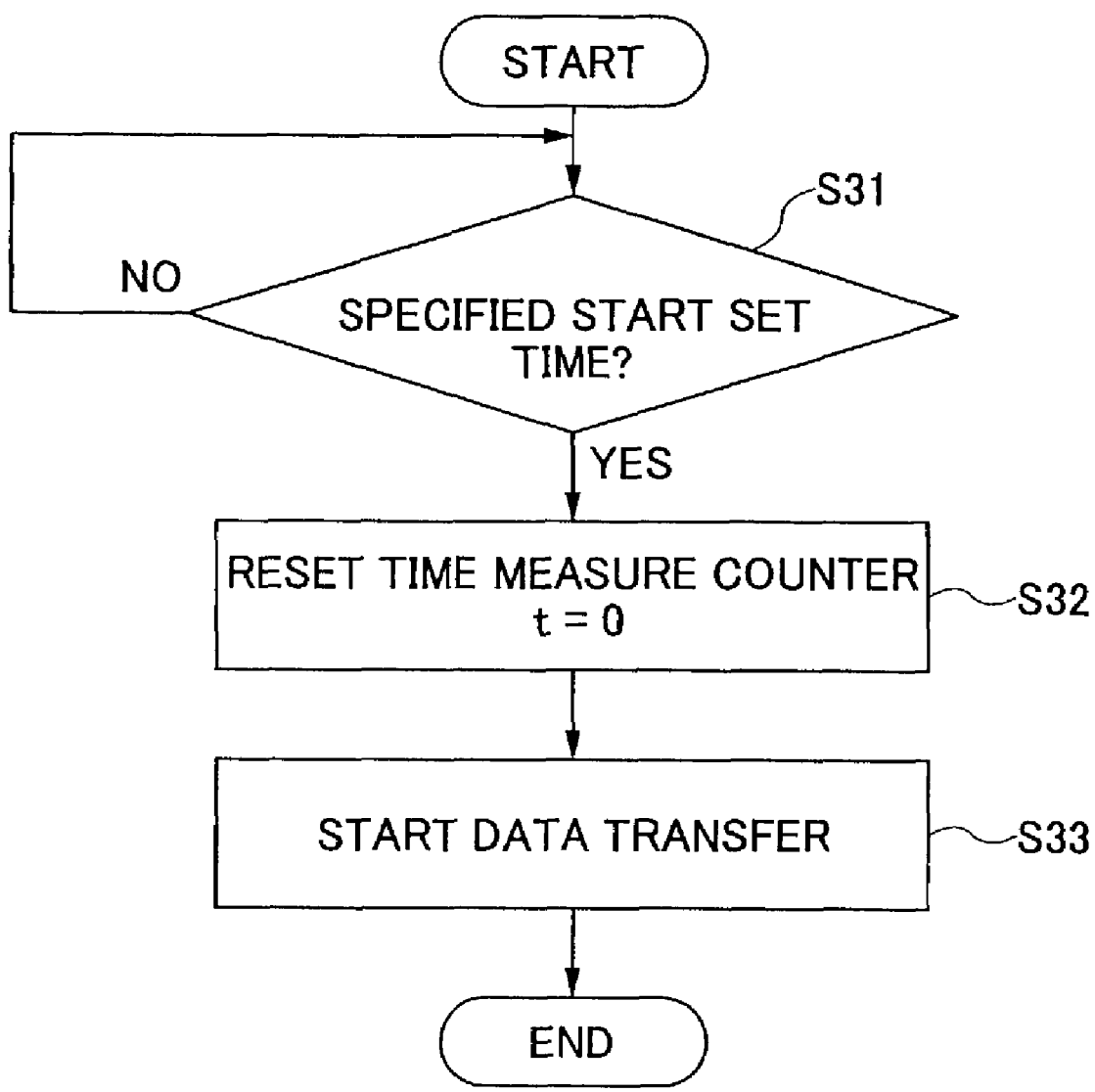
FIG. 11 shows a flow chart showing an example of transfer starting processing of the image input and output DMAC and image transfer DMAC according to the present invention.

FIG. 11 is a flow chart which shows an example of transfer start processing by the image input and output DMAC 41 and the image transfer DMAC 44.

Figure 12:
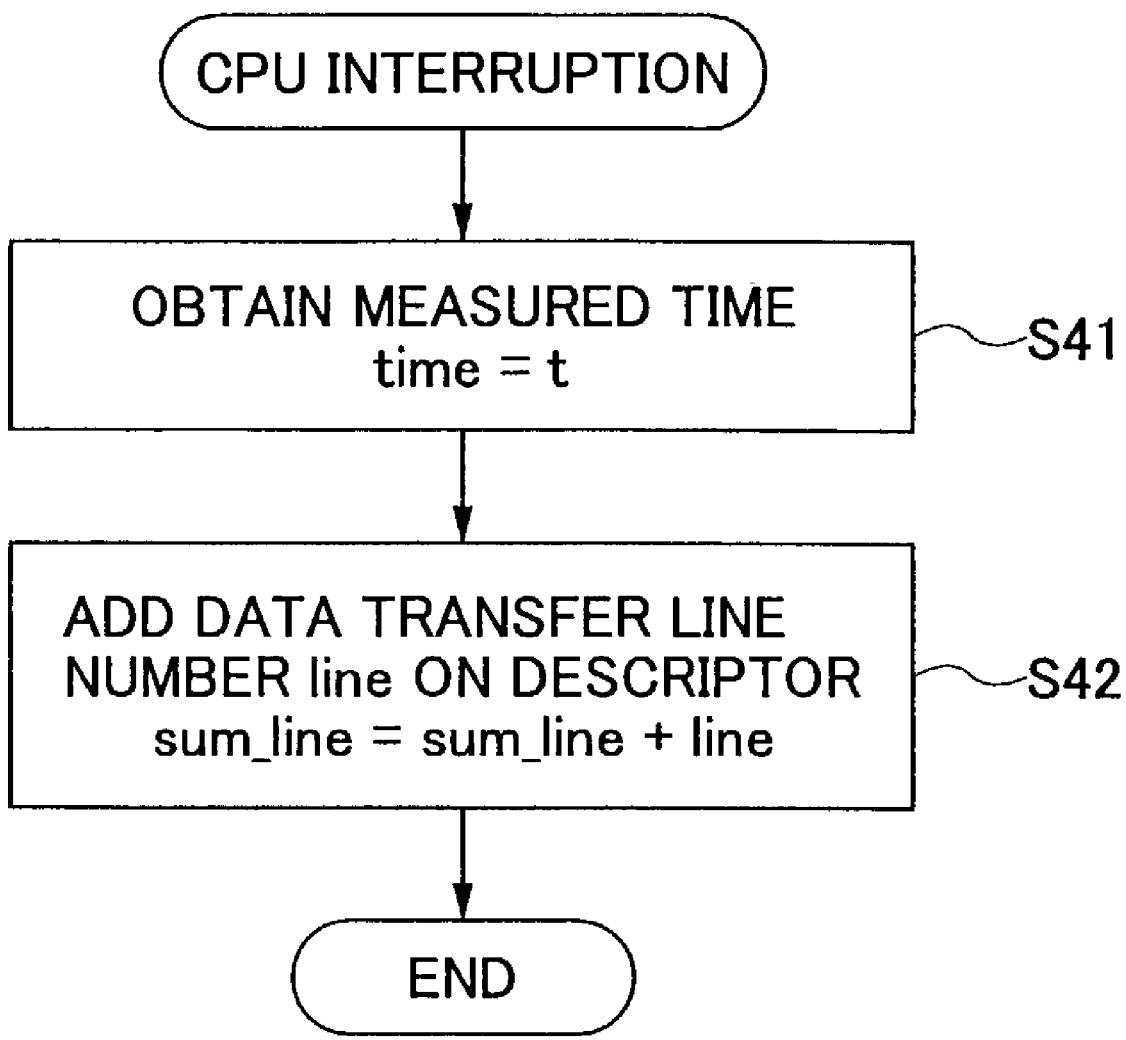
FIG. 12 shows a flow chart showing an example of CPU interruption processing by the memory control part of FIG. 1.

FIG. 12 is a flow chart which shows an example of CPU interruption processing by the memory control part 43.

Figure 13:
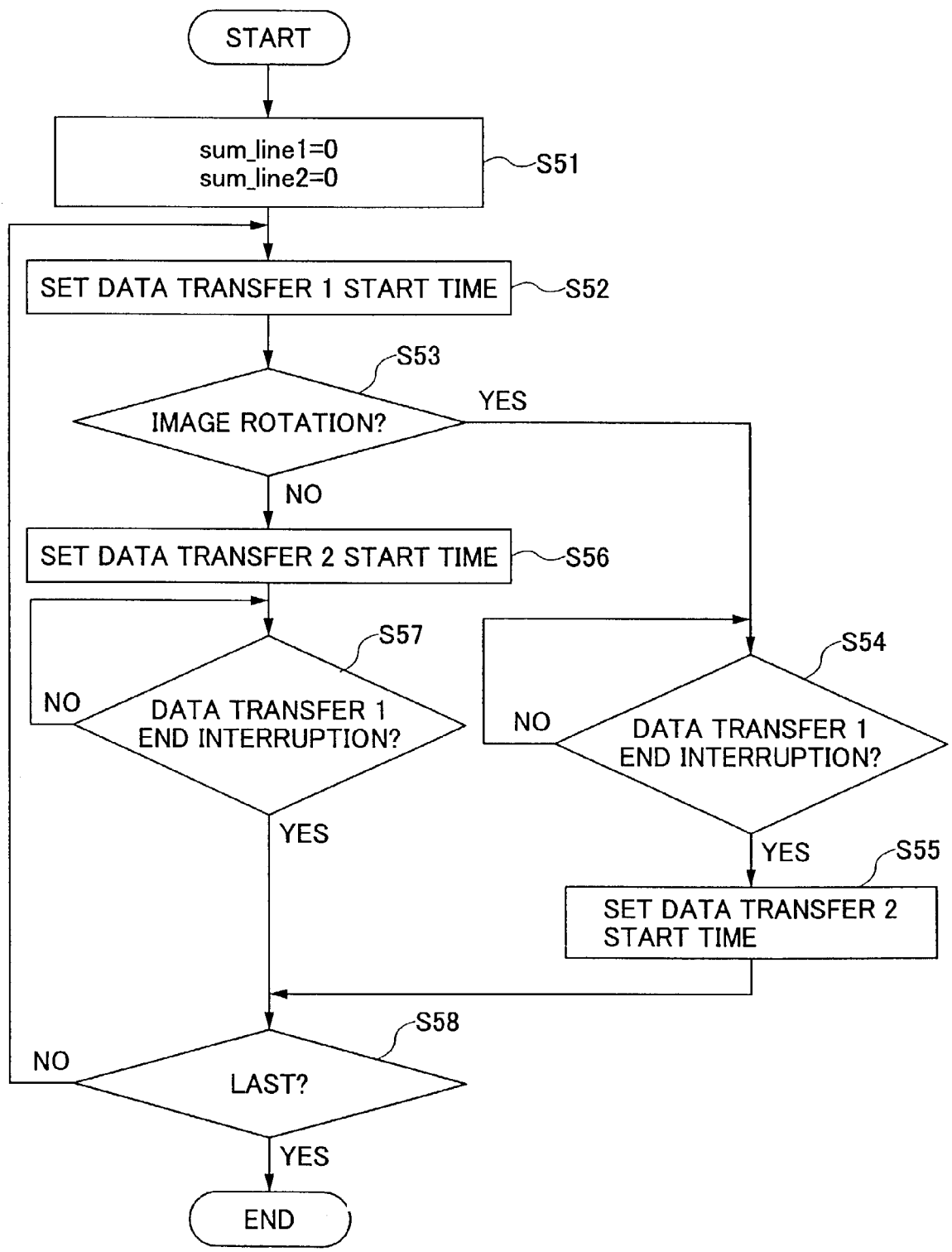
FIG. 13 shows a flow chart showing another example of transfer start timing determination processing by the memory control part of FIG. 1.

FIG. 13 is a flow chart which shows another example of transfer start timing determination processing by the memory control part 43.

The memory control part 43 can set up the data transfer start timing between the image reading part 1 and the image memory 42, and the data transfer start timing between the image memory 42 and HDD 48, independently. When the memory control part 43 receives the image input instructions and the image transfer instructions from the system control part 7, image input instructions are output to the image input and output DMAC 41, while image transfer instructions (image compression instructions) are output to the image transfer DMAC 44, respectively, and the following processing is performed.

That is, processing of loading each descriptor prepared for the image input and output DMAC 41 or the image transfer DMAC 44 corresponding the image data of each band of division obtained as described above to each "descriptor storing register" prepared correspondingly is performed. Moreover, as shown in FIG. 10, processing of resetting the number 'sum_line1' of the lines transferred (accumulated data) between the image reading part 1 and the image memory 42 into "0" is performed on the image input and output DMAC 41 (in a step S21). Simultaneously, processing of resetting the number 'sum_line2' of the lines transferred (accumulated data) between the image memory 42 and HDD 48 into "0" is performed on the image transfer DMAC 44 (in a step S21).

Subsequently, a time (referred to as "data transfer 1 start time") to be inserted until the image input and output DMAC 41 starts the data transfer between the image reading part 1 and the image memory 42 (data transfer 1) is determined (in a step S22). Then, processing of setting the data transfer 1 start time onto the image input and output DMAC 41 is performed.

Simultaneously, a time (referred to as "data transfer 2 start time") to be inserted until the image transfer DMAC 44 starts the data transfer between the image memory 42 and HDD48 (data transfer 2) is determined (in a step S23). Then, the data transfer 2 start time is set onto the image transfer DMAC 44.

That is, when data transfer has already been performed at once, based on the first and second transfer rates and the first and second progress states obtained therefrom, data transfer 1 start time and data transfer 2 start time are determined, and they are set on the image input and output DMAC 41 and the image transfer DMAC 44, respectively. At this time, the data transfer start timing by the image transfer DMAC 44 with respect to the data transfer start timing by the image input and output DMAC 41 is determined.

On the other hand, when image data has not yet been transferred, the same processing as described above is also performed. However, in this case, it is assumed that there is no difference between the first transfer rate (time required for the data transfer 1), and the second transfer rate (time required for the data transfer 2), each of the data transfer 1 start time and the data transfer 2 start time is to "0", and they are set onto the image input and output DMAC 41 and the image transfer DMAC 44.

There, when the rate of the data transfer 1 is slower than the rate of the data transfer 2, the data transfer start timing by the image transfer DMAC 44 shall be determined such that the data transfer end time on the image input-and-output DMAC 41 and the data transfer end time on the image transfer DMAC 44 be coincident. Then, the corresponding data transfer 1 start time and corresponding data transfer 2 start time are set on the image input and output DMAC 41 and the image transfer DMAC 44, respectively.

Moreover, when the amount of the image data input from the image reading part 1 exceeds the capacity of the image memory 42, the data transfer start timing by the image transfer DMAC 44 shall be determined such that the data transfer by the image transfer DMAC 44 should not pass by the data transfer by the image input and output DMAC 41. Then, the corresponding data transfer 1 start time and corresponding data transfer 2 start time are set on the image input and output DMAC 41 and the image transfer DMAC 44, respectively.

In order to determine the data transfer 2 start time, assuming that 'trans_speed 1' denotes the transfer rate (first transfer rate) of the data transfer 1; 'trans_rate 1' denotes the progress state (first progress state) of the data transfer 1; 'trans_speed 2' denotes the transfer rate (second transfer rate) of the data transfer 2; 'trans_rate 2' denotes the progress state (second progress state) of the data transfer 2; 'all_time 1' denotes the time required for the data transfer 1; and 'all_time 2' denotes the time required for the data transfer 2, the following formulas hold:

$$\text{all\_time 1} = (1 - \text{trans\_rate 1}) \times \text{all\_line} / \text{trans\_speed 1}$$

$$\text{all\_time2} = (1 - \text{trans\_rate2}) \times \text{all\_line} / \text{trans\_speed 2}$$

As described above, when the rate of the data transfer 1 is slower than the rate of the data transfer 2, assuming that 'diff_time' denotes the relevant delay time, it can be obtained by the following formula:

$$\text{diff\_time} = \text{all\_time1} - \text{all\_time2}$$

Therefore, it can be expected that a difference occurs between the end time of the data transfer 1 and the end time of the data transfer 2 by the delay time 'diff_time'. Accordingly, the memory control part 43 determines the data transfer 2 start time as the time obtained by adding the delay time 'diff_time' to the data transfer 1 start time. Then, the data transfer 2 start time thus determined is set on the image transfer DMAC 44.

When CPU interruption occurs by the transfer end of the data transfer 1 (Yes in a step S24), for the next data transfer, the memory control part 43 sets the next data transfer 1 start time on the image input and output DMAC 41 (in the step S22), and sets the next data transfer 2 start time as the image transfer DMAC 44 (in the step S23). Then, after repeating the same processing as described above and then completing data transfer of the last band (Yes of in a step S25), processing of FIG. 10 is ended.

In case where data processing is performed on input image data from the image input and output DMAC 41 (in a step S53) before being written into the image memory 42 such as to achieve rotation of the relevant image, it is preferable that the data transfer start timing by the image transfer DMAC 44 is determined (in a step S55) such that, after the data transfer by the image input and output DMAC 41 is completed, the data transfer by the image transfer DMAC 44 is started. Then, the corresponding data transfer 1 start time and corresponding data transfer 2 start time are set on the image input and output DMAC 41 and the image transfer DMAC 44, respectively (in steps S52 and S55). In FIG. 13, steps S51 and S52 are the same as in the steps S21 and S22 of FIG. 10, steps S55 and S56 are the same as the step S23 of FIG. 10, steps S54 and S57 are the same as the step S24 of FIG. 10.

When a measurement time measured by a time measurement counter A from the time of setting up the data transfer 1 start time reaches the data transfer 1 start time (actually, at the time of the subsequent CPU interruption) (Yes of in a step S31), as shown in FIG. 11, a time measurement counter A (timer) is reset (in a step S32), and the data transfer to the image memory 42 from the image reading part 1 is started (in a step S33).

When the measurement time by the time measurement counter B from the time of setting up data transfer 2 start time reaches the data transfer 2 start time (actually, at the time of subsequent CPU interruption) (Yes of in a step S31), as shown in FIG. 11, the image transfer DMAC 44 also resets the time measurement counter B (timer) (in a step S32), and starts the data transfer to HDD 48 from the image memory 42 (in a step S33).

The memory control part 43 acquires the measurement time (count value) 't' from the time measurement counter A in the image input and output DMAC 41 as the data transfer time 'time 1' by the image input and output DMAC 41, as shown in FIG. 12, whenever CPU interruption occurs in the image input and output DMAC 41 (in a step S41). Then, after that, the number of data transfer lines 'line 1' of the descriptor which corresponds to the amount of data transfer performed by the image input and output DMAC 41 is acquired, and it is added to the number 'sum line 1' of accumulated number of data transfer lines by the image input and output DMAC 41 (in a step S42).

Moreover, the memory control part 43 acquires the measurement time 't' from the time measurement counter B in the image transfer DMAC 44 as the data transfer time 'time 2' by the image transfer DMAC 44, as shown in FIG. 12, whenever CPU interruption occurs in the image transfer DMAC 44 (in a step S41). Then, after that, the number of data transfer lines 'line2' of the descriptor which corresponds to the amount of data transfer performed by the image transfer DMAC 44 is acquired, and it is added to the number 'sum_line2' of accumulated number of data transfer lines by the image transfer DMAC 44 (in a step S42).

The memory control part 43 controls acquisition/release of the resource of HDD 48, and the HDD controller 47, and permits exclusive control at a time of resource acquisition only at a time of the data transfer by the image transfer DMAC 44. Thus, in the digital copier according to the first embodiment of present invention, the memory control part 43 recognizes the data transfer rate between the image reading parts 1 (or the FAX section 3) and the image memory 42 by the image input and output DMAC 41, the progress state of the data transfer, the data transfer rate between the image memories 42 and HDD 48 by the image transfer DMAC 44, and the progress state of the data transfer, respectively. Then, based on those recognized results, the data transfer start timing from the image memory 42 to HDD 48 with respect to the data transfer start timing from the image reading part 1 to the image memory 42 is determined.

That is, it becomes possible to know the shortest processing time required for data transfer/writing into each storage, i.e., the image memory 42 and HDD 48 by examining the data transfer rate (capability) thereto, and actual data transfer progress. Then, based thereon, it is possible to determine the data transfer start timing from the image memory 42 to HDD 48 such that the time for which each of the image memory 42 and HDD 48 is occupied can be made shortest.

Thereby, even when the data transfer rate changes according to replacement of various sets of hardware which contain the image reading part 1 and HDD 48, the image data input from the image reading part 1 can be efficiently transferred and written into HDD 48 via the image memory 42 without necessities of substantial modification of software.

Furthermore, it becomes possible by recognizing a data transfer writing rate on each storage to perform optimal timing control according to the characteristic of the storage.

Moreover, the memory control part 43 controls acquisition/release of the resource of HDD 48 through the HDD controller 47, and permits exclusive control at a time of resource acquisition only at a time of the data transfer by the image transfer DMAC 44. Consequently, since it is possible to minimize the time for which HDD 48 is occupied, the use efficiency of HDD 48 can also be raised.

Furthermore, when the data transfer rate by the input and output DMAC 41 is slower than the data transfer rate by the image transfer DMAC 44, the data transfer start timing by the image transfer DMAC 44 is determined or delayed such that the data transfer end time by the image input and output DMAC 41 and data transfer end time by the image transfer DMAC 44 be coincident. Thereby, it becomes possible to perform image input operation, without making a user conscious of a difference in the data transfer time resulting from a difference in the capability of the respective storages.

That is, for example, generally, in case the image reading part (image scanner) is used, and original of a plurality of sheets of paper are input continuously, a difference in the capability among respective types of storages, and a difference in the data transfer time may become larger. Even in such a case, according to a related art, transfer of the image data from the image memory to HDD is performed at the same time image data is transferred to the image memory as primary storage, for example, from the scanner.

Then, when the image data transfer rate from the image memory to HDD is higher than the image reading rate of the scanner, a situation may occur in which no image data which should be transferred from the image memory to HDD remains in the image memory during transfer of the image data to the image memory from the scanner. In such a case, in terms of data transfer controlling from the image memory to HDD, there is a possibility that it may become impossible to perform the image input at a uniform rate.

Even in such a case, it becomes possible by determining the data transfer start timing by the image transfer DMAC 44, namely, delaying the transfer start timing suitably, as mentioned above, to avoid such a situation according to the first embodiment of the present invention. That is, according to the first embodiment of present invention, the image data of a predetermined amount is read by the scanner, and the start time of the data transfer to HDD from the image memory is determined such that, when the processing of transfer to the image memory and written therein is completed, the processing of the image data of the predetermined amount is transferred and written in HDD from the image memory be completed simultaneously. Thereby, occurrence of the situation that no image data which should be transferred to HDD from the image memory remains while the image data is still transferred from the scanner to the image memory, can be prevented beforehand. Consequently, an efficient image input is attained.

Furthermore, in case of reading of an original image having a considerably long dimension by the image reading part 1 so that a predetermined amount of the image data to be input from the image reading part 1 may exceed the capacity of the image memory 42, it is necessary to avoid a situation in which the image memory 42 becomes full during writing of the image data from the scanner (image reading part 1) to the image memory 42. If such a situation occurred, he image reading operation by the scanner should be terminated before the completion of the reading of the predetermined amount of image data. Therefore, it is indispensable to start transfer of the image data from the image memory to HDD suitably during image data transfer to the image memory from the scanner.

In that case, if the transfer start timing from the image memory to HDD is too early, while transferring the image data from the scanner to the image memory, a situation occurs in that no image data which should be transferred to HDD from the image memory remains in the image memory, as mentioned above. Even in such a case, according to the first embodiment of present invention, the data transfer (transfer to HDD from image memory) start timing by the image transfer DMAC 44 is determined namely, delayed so that the data transfer (transfer to HDD from the image memory) by the image transfer DMAC 44 do not pass by the data transfer (transfer to the image memory from a scanner) by the image input and output DMAC 41. Consequently, during data transfer from the scanner to the image memory, occurrence of a situation in that no image data which should be transferred to HDD from the image memory remains in the image memory can be prevented, beforehand. Therefore, the image data input from the image reading part 1 can be efficiently transferred to HDD 48 with high accuracy via the image memory 42, without providing special measures.

Moreover, when rotating a relevant image by performing data processing image data input from the image input and output DMAC 41, the data transfer (data transfer to HDD from image memory) start timing by the image transfer DMAC 44 is determined namely, delayed so that, after writing in the image memory 42 and the data transfer (processing by which the image data is written in the image memory after the above-mentioned image rotation processing) by the image input and output DMAC 41 is completed, the data transfer by the image transfer DMAC 44 be started. Consequently, complicated transfer control becomes unnecessary and a load of the CPU of the memory control part 43 can be effectively reduced.

Furthermore, it is preferable to equip the image input and output DMAC 41 and the image transfer DMAC 44 with the function of measuring the data transfer rate, respectively. Consequently, even when replacement of the image memory 42 or HDD may be performed, the memory control part 43 can acquire the measurement result of actual data transfer rate from the image input and output DMAC 41 and the image transfer DMAC 44. Therefore, since those actual data transfer rates can be recognized, the optimal timing suitable for the actual performance of these storages after replacement can be determined as the data transfer start timing by the image transfer DMAC 44. Therefore, it becomes possible to transfer efficiently image data input from the image reading part 1 to HDD 48 with high accuracy via the image memory 42.

In addition, the image input and output DMAC 41 and the image transfer DMAC 44 may measure data transfer rates in response to instructions input from the operation part 6 corresponding to key operation on the operation part 6 by a user. Consequently, such measurement processing may be performed only at a time of replacement occasion of storage/ image reading device. Therefore, it is possible to eliminate a possibility of lowering the productivity of the copier by always carrying out such measurement processing. That is, no adverse affection on the copy productivity in the digital copier occurs. Moreover, as always carrying out the measurement processing is avoided, load of the CPU of the memory control part 43 is also effectively reduced.

Alternatively, to measure the data transfer rate may be performed at a time of input of image data by the image input and output DMAC 41, in each of the image input and output DMAC 41 and image transfer DMAC 44. Consequently, there is no need that a user inputs measurement instructions of data transfer rate to the image input and output DMAC 41 and the image transfer DMAC 44 by key operation on the operation part 6. Therefore, load of the user may be effectively reduced.

A case where, after data conversion/transform processing, i.e. data compression processing, etc. and the thus-obtained image data is saved in a mass storage device will now be discussed especially. In such a case, it is common the image data becomes smaller than the before by the amount of data after the data conversion/transform. Also in such a case, image data transformed may be once stored in an image memory, i.e., a semiconductor memory or the like, and, then, after that, data transfer is made from the image memory to a mass storage, i.e., HDD or the like. Thereby, it may be possible to reduce the time for which the mass storage is occupied, or, the processing time of image input and output performed by the image processing apparatus may also be effectively reduced.

There are various types of forms of performing image data conversion/transformation such that, according to some data transformation scheme, it may not be possible to estimate the data amount of data obtained through the data conversion/transformation. For example, there are a fixed-length compression and a variable-length compression as data conversion/transformation processing, in particular, data compression processing. In particular, in the variable-length compression scheme, the maximum amount of data obtained after the data processing cannot be estimated accurately. In such a case, if a semiconductor memory or the like which is superior in terms of access rate but inferior in terms of unit storage capacity price is used, as it may be necessary to prepare a considerably large capacity of the memory, the cost per performance would be degraded.

Thus, when memorizing image data after data conversion/ transformation to a semiconductor memory, the storage capacity thereof cannot be determined accurately beforehand. Moreover, in case the amount of data becomes large rather than the original image data through data conversion/ transformation, the storage capacity required for the data preservation after data conversion/transformation increases.

Thus, in case of a change occur in the storage capacity required for saving data after data conversion/transformation depending on the characteristic of image data, the characteristic of the conversion/transformation forms, etc., it would be difficult to appropriately select the configuration of a storage system including a semiconductor memory and a mass storage device. Consequently, it may be difficult to effectively reduce the cost required for the data storage system.

According to an aspect of the present invention on which a second embodiment of the present invention is based, in an image processing apparatus which has an image storage system including a secondary storage (mass storage device) for saving image data which has been once memorized by a primary storage (semiconductor memory), it becomes possible to efficiently store image data after undergoing image data conversion/transformation processing such as data compression into the secondary storage via the primary storage. Consequently, it becomes possible to improve the productivity/yield of the image processing apparatus, without substantial cost rise.

The second embodiment of the present invention for achievement of the above-mentioned purpose will now be described.

A digital copier according to the second embodiment of the present invention has the same configuration as the digital copier according to the first embodiment described above. Therefore, duplicated description is omitted as much as possible, and a description will be made in detail especially only within portions which are different from the first embodiment.

Figure 14:
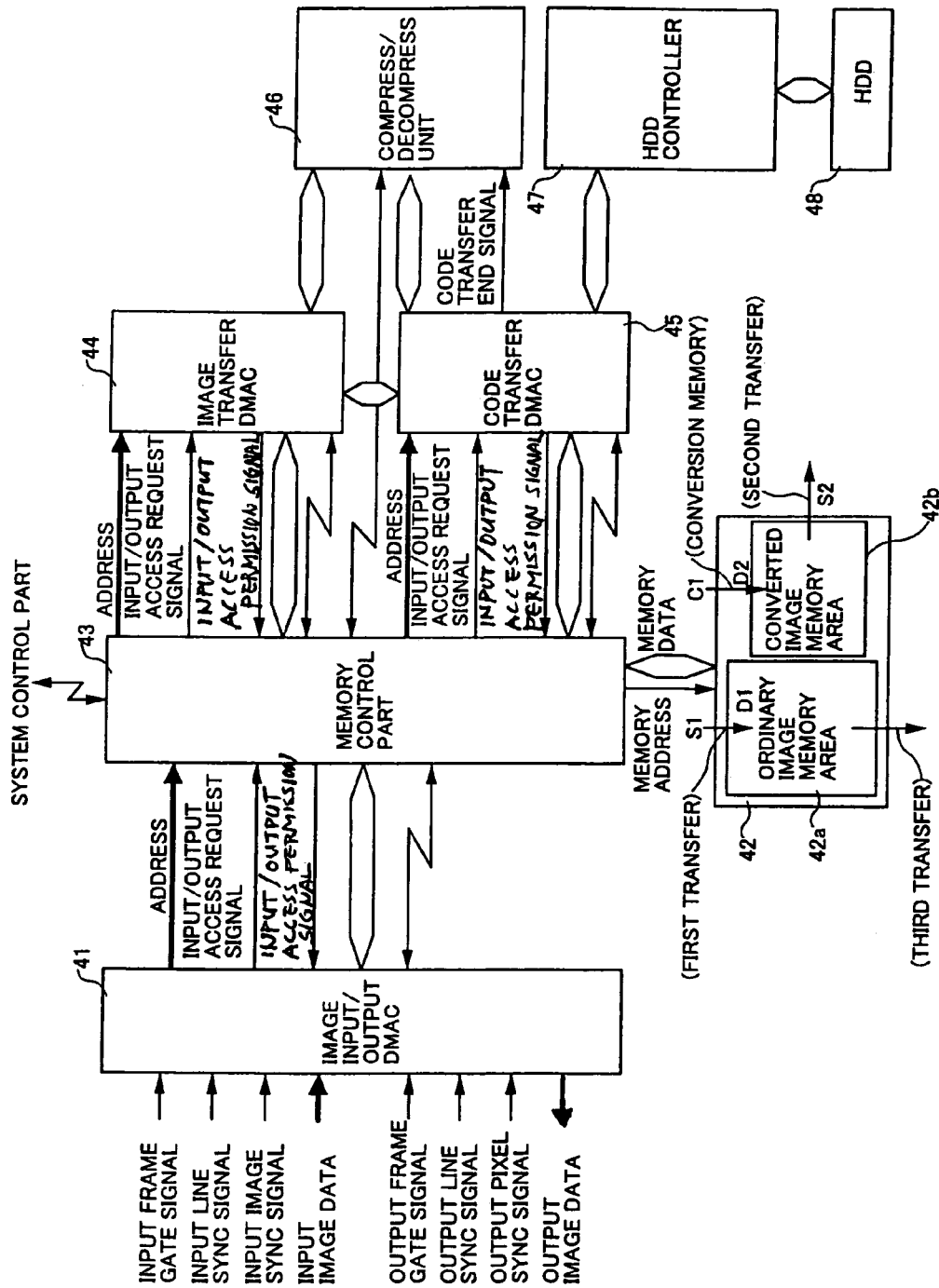
FIG. 14 shows a block diagram showing an example of configuration of an image memory part contained in a digital copier which is an image processing apparatus according to the second embodiment of the present invention.

FIG. 14 shows a block diagram corresponding to FIG. 1 of the first embodiment. A different portion from FIG. 1 in this figure is only concerning the image memory 42. In the second embodiment, the image memory 42 includes semiconductor storage cells, such as DRAMs, as in the same image memory 42 as the first embodiment. Moreover, 4 M bytes for a memory area ("ordinary image memory area" 42a) which can store binary image data for a A3 size by 400 dpi as in the first embodiment usually used as a memory for image storage. 8 M bytes in total as a result of further including other 4 M bytes of a memory area used as a memory for electronic sorting storage. Furthermore, finally, 9 M bytes in total as a result of further including 1 M bytes for a memory area ("converted image memory area" 42b) used as a memory for converted/transformed image data storage which stores code data which is image data after compression (conversion/transformation into a code data form) processing by the code transfer DMAC 45.

In case the code data which is image data after compression processing is stored temporarily, the memory control part 43 can secure the above-mentioned conversed image memory area 42b in the image memory 42 according to instructions from the system control part 7.

Next, the memory control part 43 in the second embodiment will now be described.

The memory control part 43 in this case also includes the image input and output DMAC 41, the image transfer DMAC 44, code transfer DMAC 45, and the HDD controller 47. The memory control part 43 thus functions as a first data transfer device, a first transfer rate recognition device, a first progress state recognition device, a converted image memory area securing device, a conversion memory data transfer device, a conversion memory transfer rate recognition device, a conversion memory progress state recognition device, a second data transfer device, a third data transfer device, transfer control device, a conversion memory transfer start timing determination device, a second transfer start timing determination device, a third transfer start timing determination device, a resource control device, and an exclusive control permission device.

Moreover, also in this case, the memory control part 43 includes CPU and logic circuit, communicates with the system control part 7, receives instructions, and performs a setup of parameters, and thus performs reading-out and the writing-in of image data from/to the image memory 42 according to the instructions.

Moreover, the memory control part 43 in the second embodiment can also perform the following processing.

Namely, the data added to the instructions (for example, image input instructions) is analyzed, when process execution instructions are received from the system control part 7. Thereby, a first transfer rate (data transfer rate from the image reading part 1 or the FAX section 3 to the ordinary image memory area 42a in the image memory 42), a second transfer rate (data transfer rate from the converted image memory area 42b in the image memory 42 to HDD 48), and a compression processing rate (rate at which data is read from the ordinary image area 42a in the image memory 42, data conversion is carried out thereon by in the compression decompression part 46, and the thus-converted image data is written into the converted image memory area 42b in the image memory 42) by the compression/decompression unit 46 are recognized.

Furthermore, when first transfer rate data is received from the image input and output DMAC 41, the first transfer rate is recognized by analyzing the data by the memory control part. When second transfer rate data is received from the HDD controller 47, the second transfer rate is recognized by analyzing the data thereby. When compression processing rate data is received from the compression/decompression unit 46, the compression processing rate of the compression/decompression unit 46 is recognized by analyzing the data thereby.

Moreover, when first progress state data is received from the image input and output DMAC 41, the memory control part 43 recognizes a first progress state (progress state of the data transfer to the ordinary image memory area 42a in the image memory 42 from the image reading part 1 or from the FAX section 3) by analyzing the data. When "conversion memory progress state" data is received from the code transfer DMAC 45, conversion memory progress state (progress state of data transfer to the "converted image memory area" 42b in the image memory 42 from the compression/decompression unit 46) is recognized by analyzing the data thereby.

Furthermore, when second progress state data is received from the HDD controller 47, a second progress state (progress state of data transfer to HDD48 from the "converted image memory area" 42b in the image memory 42) is recognized by analyzing the data thereby.

Furthermore, in the case of the second embodiment, the following function is provided as a function of the code transfer DMAC 45. Namely, a progress state (referred to as a "conversion memory progress state") of data transfer to the "converted image memory area" 42b in the image memory 42 from the compression/decompression unit 46 is recognized, and it is output to the memory control part 43 by using the recognition result as the conversion memory transfer progress state data.

Furthermore, there is the following function as a function of the HDD controller 47. Namely, a data transfer rate (referred to as a "second transfer rate") from the "converted image memory area" 42b in the image memory 42 to HDD 48 is measured. The measurement result is then output to the memory control part 43 as the second transfer rate data. A progress state (refereed to as a "second progress state") of data transfer to HDD 48 from the converted image memory area 42b in the image memory 42 is recognized, and the recognition result is output to the memory control part 43 as the second progress state data.

Moreover, in the second embodiment, as in the first embodiment in the memory control part 43, the difference calculation part 54 subtracts the number of input-and-output processing lines output from the image input and output DMAC 41 from the number of transfer processing lines output from the image transfer DMAC 44, and outputs the subtraction result as the line number difference to the difference comparison part 55. The difference comparison part 55, when the line number difference is "0", masks a transfer memory access request signal from the image transfer DMAC 44, and thereby, data transfer processing to the image transfer DMAC 44 from the image memory 42 is stopped. Consequently, passing by of the memory address is prevented beforehand. That is, the memory address output from the transfer image address counter part 52 is prevented from becoming larger than the memory address output from the input-and-output image address counter part 51. That is, data transfer to the compression/decompression unit 46 from the image memory 42 is prevented from passing by data transfer to the image memory 42 from the image reading part 1.

Moreover, in the second embodiment, "the first transfer rate" in the first embodiment indicates data transfer rate from the image reading part 1 to "the ordinary image memory area" 42a in the image memory 42, in the transfer rate recognition processing by the memory control part 43.

Moreover, when processing of recognizing compression processing rate (data form conversion speed) on the compression/decompression unit 46 is required, the device name, the version, and compression processing rate of each type of compression/decompression device which can be used by this system (digital copier) is stored in an internal memory of the system control part 7 by using as a data table, by an operation signal beforehand input by key operation on the operation part 6. Then, the system control part 7 reads the device name and version on the compression/decompression unit 46 actually mounted in the system, and the compression processing rate of the compression/decompression unit 46 is acquired by referring to the data table at a time of initial setup of the system, and information indicating the compression processing rate is added to the process execution instructions to be transmitted to the memory control part 43. Thereby, the memory control part 43 can recognize the compression processing rate of the compression/decompression unit 46 by analyzing the data added to the instructions, when the process execution instructions are received from the system control part 7.

The second transfer rate (data transfer rate from the converted image memory area 42b in the image memory 42 to HDD 48) which is the data transfer rate by the HDD controller 47 depends on the writing rate of HDD 48.

Next, with reference to FIG. 7 and FIG. 8 also used in the description for the first embodiment, another example of transfer rate recognition processing by the memory control part 43, compression processing rate measurement processing by the compression/decompression unit 46, and transfer rate measurement processing by the image input and output DMAC 41 and the HDD controller 47 will now be described for the second embodiment.

In this case, FIG. 7 is a flow chart which shows an example of the compression processing rate measurement processing by the compression/decompression unit 46 and the transfer rate measurement processing by the image input and output DMAC 41 and the HDD controller 47. FIG. 8 shows an example of a transfer rate measurement instruction image displayed on a character display device with a touch panel on the operation part 6 (exterior) not shown.

Each of the compression/decompression unit 46, the image input and output DMAC 41, and the HDD controller 47 starts processing of FIG. 7, in response to instructions for measurement of data transfer rate (key of "Yes" on "memory data transfer rate measurement" of FIG. 8 being pressed), by which measurement of data transfer rate is directed via the memory control part 43 by the system control part 7, by key operation on the operation part 6.

A time measurement counter is reset (in a step S1), and a "measurement result preservation area" is secured to the memory (in a step S2), and a notice of a data transfer start from the memory control part 43 is waited for (in a step S3).

At this time, the least significant bit of the format information on the corresponding descriptor memorized by the internal memory is set as "0" so that CPU interruption occurs at a time data transfer (for example, 1 byte of data transfer) ends.

Then, when data (for example, image data which is input from the image reading part 1 in case of the input and output image DMAC 41, or data for transfer rate measurement set up beforehand for transfer rate measurement) transfer is started and the notice of data transfer start (or compression processing start) is received from the memory control part 43 (Yes of in a step S4), the time measurement by the time measurement counter is started (in a step S5). After that, by CPU interruption, a data transfer (or compression processing) end is recognized (Yes of in a step S6 and in a step S7), the time measurement by the time measurement counter is stopped (in a step S8), and data transfer rate (or compression processing rate) is calculated (in a step S9).

For example, assuming the 'line' denotes the number of data transfer lines while 'time' denotes the measurement time (count value) for that number of data transfer lines by the time measurement counter, data transfer rate 'trans_speed' is calculated by the following formula:

$$trans\_speed = line/time$$

When the calculation of data transfer rate trans_speed is completed, the data indicating the calculation result is saved in the measurement result preservation area in the memory (in a step S10), and processing of FIG. 7 is ended.

The data saved in the "measurement result preservation area" in the memory is output to the memory control part 43 at a predetermined timing. That is, the image input and output DMAC 41 outputs this data as the first transfer rate data; the HDD controller 47 outputs it as the second transfer rate data; and the compression/decompression unit 46 output it as the compression processing rate data, respectively.

Therefore, the memory control part 43 can recognize the first transfer rate by analyzing the data, when the first transfer rate data is received from the image input and output DMAC 41. When the second transfer rate data is received from the HDD controller 47, the second transfer rate can be recognized by analyzing the data thereby. When the compression processing rate data is similarly received from the compression/decompression unit 46, the compression processing rate can be recognized by analyzing the data thereby.

In addition, the compression processing rate (speed) measurement processing and transfer rate measurement processing by the compression/decompression unit 46, the image input and output DMAC 41, and the HDD controller 47 described above can also be automatically started at a time of the input of the image data from the image reading part 1 (or the FAX section 3). In this case, for example, the data prepared for transfer rate measurement set up beforehand is not needed, but a part of image data actually input from the image reading part 1 (or the FAX section 3) is used, and transfer rate measurement processing or compression speed measurement processing can be performed therewith.

The compression/decompression unit 46 measures the compression processing rate by the same processing as in the image input and output DMAC 41 and the HDD controller 47 at the same timing, and after saving the data indicating the measurement result into the measurement result preservation area in the memory, it is output to the memory control part 43 at predetermined timing as the compression processing rate data. Therefore, when the memory control part 43 receives the compression processing rate data from the compression/decompression unit 46 as mentioned above, the compression processing rate on the compression/decompression unit 46 can be recognized by analyzing the data, thereby.

Next, also with reference to FIG. 9 used in the first embodiment, the recognition processing of the progress state of the image input and output DMAC 41, the code transfer DMAC 45, and the data transfer by the HDD controller 47 in the second embodiment will now be described. In this case, FIG. 9 illustrates the recognition processing of the data transfer by the progress state of the image transfer DMAC 44, the code transfer DMAC 45, and the HDD controller 47.

In order that the image input and output DMAC 41 may recognize the progress state of the data transfer to the ordinary image memory area 42a in the image memory 42 from the image reading part 1, for example, as shown in FIG. 9, the descriptor which the image input and output DMAC 41 uses is divided for a plurality of bands (in this example, 11 bands) of the relevant transfer data, and the number (divided line number) Na of data transfer lines on the descriptor A for the first band is set as "1." Furthermore, for each of the second, third, . . . , and eleventh bands, each of the numbers Nb, Nc, . . . , Nk of data transfer lines on the respective descriptor B, C, . . . , K is set as the value obtained by division with ten the remaining number after subtraction of "1" from the total number of lines of a predetermined set of image data, for example, a page of image data). Furthermore, the least significant bit of the format information on each of the descriptor A, B, C, . . . , K for the first, second, third, . . . , eleventh bands is set as "0" (so that CPU interruption may occur). In addition, the total number of lines shall be beforehand specified by the system control part 7.

Consequently, the image input and output DMAC 41 can acquire the number of data transfer lines at the present time based on the number of data transfer lines of the descriptor corresponding to the image data at the time of CPU interruption. Thereby, the progress state of transfer of image data can be recognized by the number of transfer lines.

For example, when 'sum_line' denotes the accumulated number of transfer lines; and 'all_line' denotes the total number of lines, the progress state 'trans_rate' of data transfer can be calculated by the following formula:

trans_rate=sum_line/all_line

In the example of FIG. 9, the progress state of the data transfer to the ordinary image memory area in the image memory 42 from the image reading part 1 can be recognized by ten divisions. It becomes possible by increasing the number of divisions of the descriptor to raise the recognition accuracy of the progress state of the data transfer to the ordinary image memory area 42a in the image memory 42 from the image reading part 1.

Similarly, in order that the code transfer DMAC 45 may recognize the progress state of the data transfer to the converted image memory area 42b in the image memory 42 from the compression/decompression unit 46, the descriptor which the code transfer DMAC 45 uses is divided for 11 bands of transfer data. Then, the number Na of data transfer lines of the descriptor A for the first band is set up with "1", and for the second, third, . . . , eleventh bands, each of the numbers Nb, Nc, . . . , Nk of data transfer lines on each descriptor B, C, . . . , K is set as the value obtained by dividing the remaining number. Furthermore, the least significant bit of the format information of each descriptor A, B, C, . . . , or K for the first, second, third, . . . , eleventh bands of transfer data lines is set as "0" (so that CPU interruption may occur). Consequently, the code transfer DMAC 45 can recognize the progress state of the data transfer to the converted image memory area 42b in the image memory 42 from the compression/decompression unit 46 by ten divisions. It becomes possible by increasing the number of divisions of the descriptor to raise the recognition accuracy of the progress state of the data transfer to the converted image memory area 42b in the image memory 42 from the compression/decompression unit 46.

Similarly, the HDD controller 47 divides into 11 bands of transfer data the descriptor which the HDD controller 47 uses, in order to recognize the progress state of data transfer from the converted image memory area 42b to HDD 48 in the image memory 42. Then, the number Na of data transfer lines of the descriptor A for the first band is set up with "1." Then, for the second, third, . . . , eleventh bands of transfer data, each of the numbers Nb, Nc, . . . , Nk of data transfer lines on each descriptor B, C, . . . , K is set as the value obtained by division with ten the remaining numbers of image lines.

Furthermore, the least significant bit of the format information on each of the descriptors A, B, C, . . . , K for the 11 bands of transfer data is set as "0" (so that CPU interruption may occur). Consequently, the HDD controller 47 can recognize the progress state of the data transfer to HDD 48 from the converted image memory area 42b in the image memory 42 by ten divisions. In addition, the recognition accuracy of the progress state of data transfer from the converted image memory area in the image memory 42 to HDD 48 can be raised by increasing the number of divisions of the descriptor.

Next, the data transfer processing by the image memory part 4 containing the memory control part 43 in the second embodiment will now be described with reference to FIGS. 15 through 23.

Figure 15:
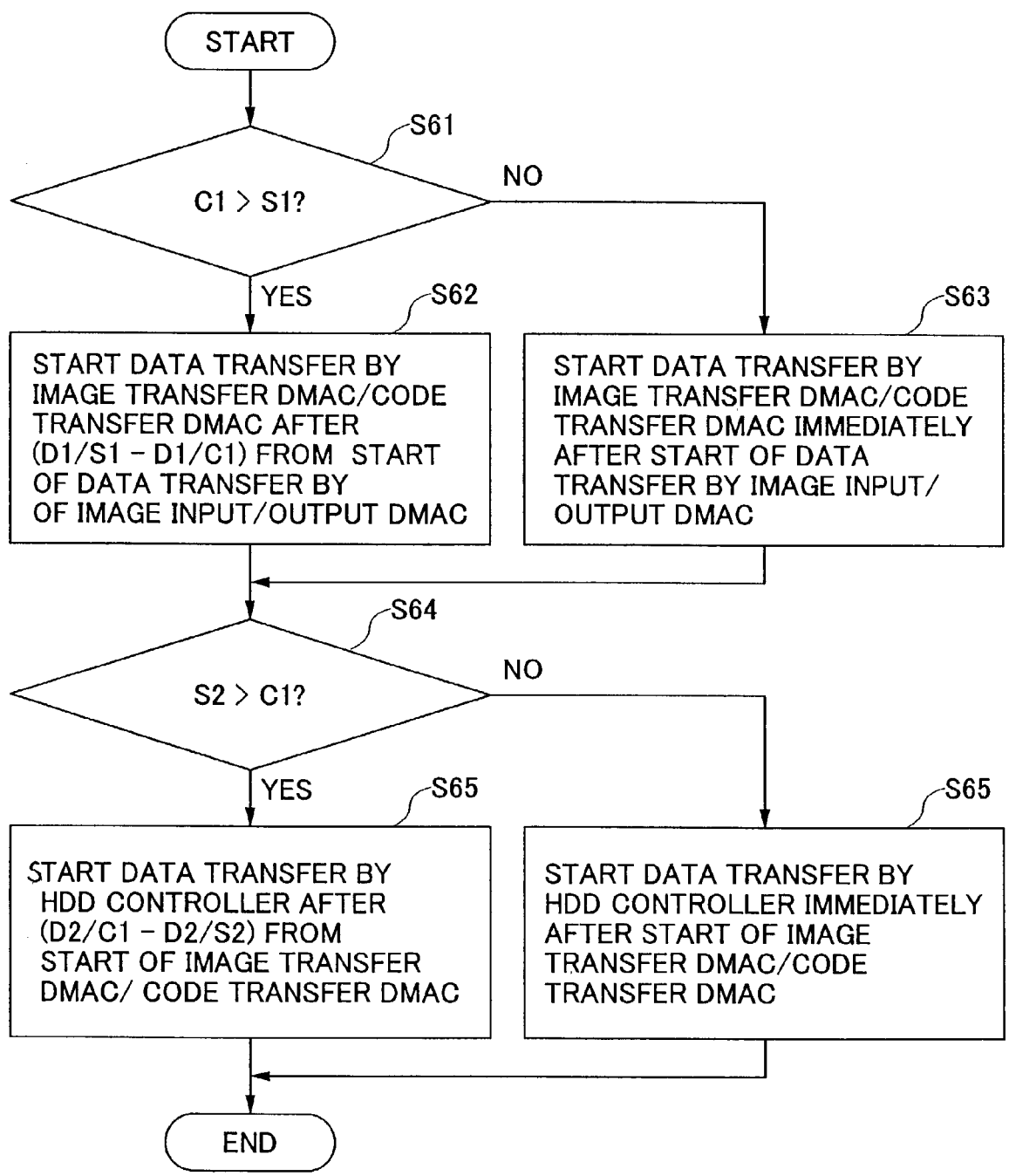
FIG. 15 shows a flow chart showing an example of data transfer processing by the second embodiment of the present invention by the memory control part of FIG. 14.

FIG. 15 is a flow chart which shows an example of data transfer processing by the memory control part 43 in the second embodiment.

The amount (the number of data transfer lines per one descriptor by the image input and output DMAC 41) of the image data written in the ordinary image memory area 42a in the image memory 42 by the image input and output DMAC 41 is referred to as D1 (bytes); the amount (the number of data transfer lines per one descriptor by the code transfer DMAC 45) of the code data written in the converted image memory area 42b in the image memory 42 by the code transfer DMAC 45 is referred to as D2 (bytes); the data transfer rate (first transfer rate) by the image input and output DMAC 41 is referred to as S1 (bytes/second); the compression processing rate (data transfer rate from the compression/decompression unit 46 to the converted image memory area 42b in the image memory 42) with the compression/decompression unit 46 referred to as C1 (bytes/second); and the data transfer rate (second transfer rate) by to the HDD controller 47 is set to S2 (bytes/second).

FIG. 11 shows a timing chart in case the data transfer rate (first transfer rate) S1 by the image input and output DMAC 41 is slower than the compression processing rate C1 with the compression/decompression unit 46 (Yes of in a step S61 of FIG. 15). This timing chart shows the data transfer start timing by the image transfer DMAC 44 and the code transfer DMAC 45, i.e., timing chart for illustrating the start timing of the data transfer to the compression/decompression unit 46 from the ordinary image memory area 42a in the image memory 42, and the data transfer to the converted image memory area 42b in the image memory 42 from the compression/decompression unit 46.

FIG. 17 is a timing chart for illustrating the data transfer start timings by the image transfer DMAC 44 and the code transfer DMAC 45 when the compression processing rate C1 with the compression/decompression unit 46 is slower than the data transfer rate S1 by the image input and output DMAC 41 (No of in a step S61).

FIG. 18 is a timing chart for illustrating the data transfer start timing (data transfer start timing from the converted image memory area 42b in the image memory 42 to HDD 48) by the HDD controller 47 when the compression processing rate C1 with the compression/decompression unit 46 is slower than the data transfer rate (second transfer rate) S2 by the HDD controller 47 (Yes of in a step S64).

FIG. 19 is a timing chart for illustrating the data transfer start timing by the HDD controller 47 when the data transfer rate S2 by the HDD controller 47 is slower than the compression processing rate C1 with the compression/decompression unit 46 (No of in a step S64).

First, the memory control part 43 secures the converted image memory area 42b beforehand in the image memory 42. In the image-data transferred to the ordinary image memory area 42a in the image memory 42 from the image reading part 1 or the FAX section 3 when CPU interruption occurs in the image input and output DMAC 41, when transfer of the image data of the number of data transfer lines on one descriptor is completed, this fact is recognized with the first progress state data from the image input and output DMAC 41, and processing of FIG. 15 is started.

That is, S1 which is the first transfer rate to memory area 42a of the image memory 42 and the compression processing rate C1 are measured first (in a step S61). In this case, the first transfer rate S1 can be measured from the actual data transfer result of the number of data transfer lines on one descriptor, while the compression processing rate C1 can be acquired from the data setup beforehand.

Figure 16:
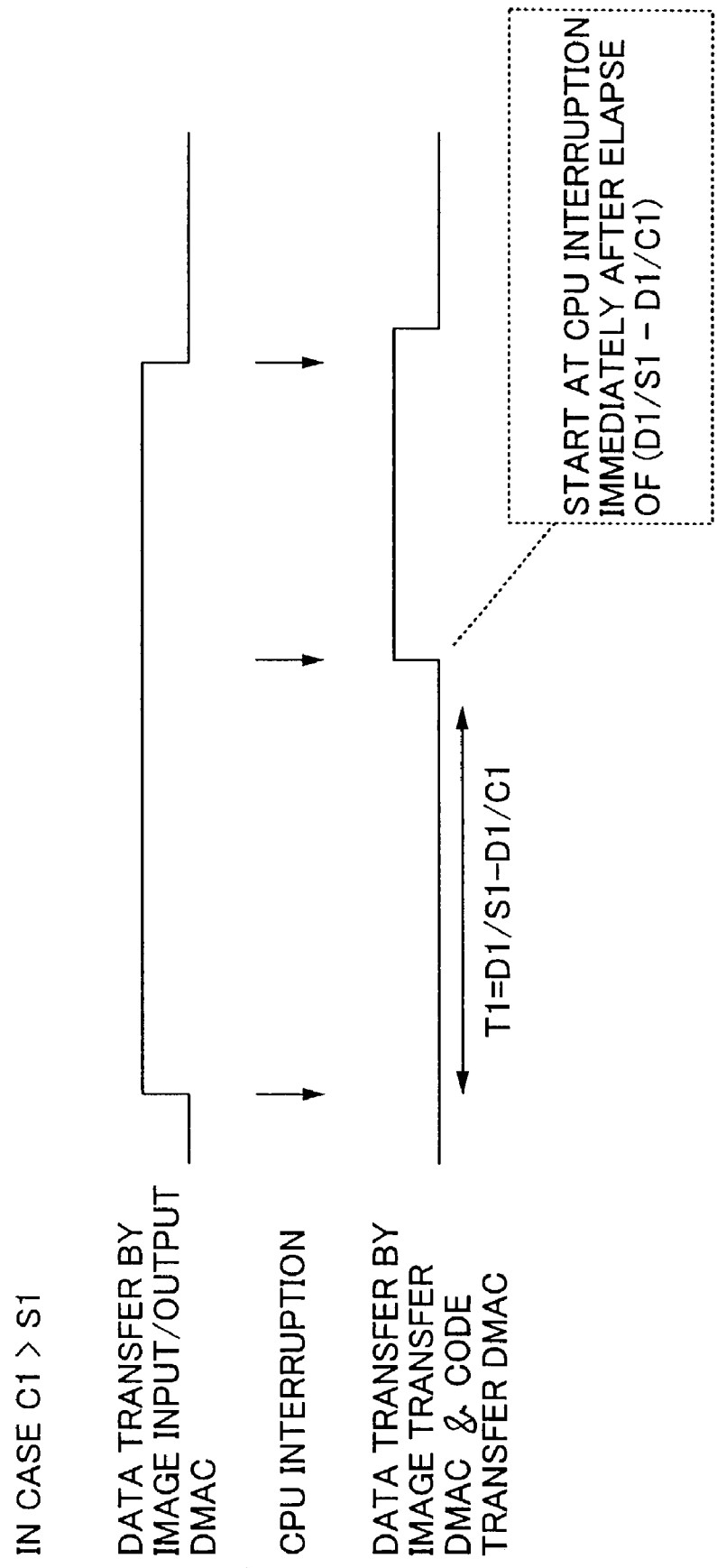
FIG. 16 shows a timing chart for illustrating data transfer start timing by the image transfer DMAC, and the code transfer DMAC when the data transfer rate by the image input and output DMAC is slower than the compression processing rate with the compression/decompression unit of FIG. 14.

When S1 is slower than C1 (Yes in the step S61), in a step S62 of FIG. 15, as shown in FIG. 16, the data transfer start timing by the image transfer DMAC 44 and the code transfer DMAC 45 is determined. Namely, the start timing of the data transfer by the image transfer DMAC 44 and start timing of data transfer by the code transfer DMAC 45 is determined such that, after the data transfer (data transfer to the ordinary image memory area 42a in the image memory 42 from the image reading part 1 or the FAX section 3) by the image input and output DMAC 41 is started, then, at the time of CPU interruption occurring in the image input and output DMAC 41 after T1 (=D1/S1−D1/C1) elapses, data transfer by the image transfer DMAC 44 and the code transfer DMAC 45 is started.

When C1 is slower than S1 (No of in the step S61), as shown in FIG. 17, the data transfer start timing is determined such that data transfer by the image transfer DMAC 44 and the code transfer DMAC 45 is started immediately (at the time of the first CPU interruption occurrence in the image input and output DMAC 41 immediately after starting of the data transfer by the image input and output DMAC 41). Then, the image transfer DMAC 44 and the code transfer DMAC 45 are started according to this timing (in a step S63).

By starting (in a step S62 or S63) of the image transfer DMAC 44 and the code transfer DMAC 45, the image data written in the ordinary image memory area 42a in the image memory 42 by the image input and output DMAC 41 is transferred to the compression/decompression unit 46 by the image transfer DMAC 44. Also the code data which is image data after the compression processing with the compression/decompression unit 46 is transferred and written in the converted image memory area 42b secured in the image memory 42 by the code transfer DMAC 45.

Next, the memory control part 43 compares the second transfer rate S2 to HDD 48 with the compression processing rate C1 in a step S64. Consequently, when C1 is slower than S2 (Yes), as shown in FIG. 18, the data transfer start timing by the HDD controller 47 is determined (in a step S65). That is, after the data transfer by the image transfer DMAC 44 and the code transfer DMAC 45 is started, the data transfer by the HDD controller 47 is started at the time of next CPU interruption occurring in the code transfer DMAC 45 after T2 (=D2/C1−D2/S2) elapses (it is recognized with the second progress state data from the code transfer DMAC 45). Then, the HDD controller 47 is started according to the timing.

When S2 is slower than C1 (No of in the step S64), as shown in FIG. 19, the data transfer start timing is determined by processing a step S66 so that, at the time of the first CPU interruption occurrence in the code transfer DMAC 45 immediately after starting of the data transfer by the image transfer DMAC 44 and the code transfer DMAC 45, the data transfer by the HDD controller 47 is started. Then, the HDD controller 47 is started according to the timing.

By the HDD controller 47, the code data written in the converted image memory area 42b in the image memory 42 by the code transfer DMAC 45 is transferred to HDD 48, and is written in on the HD, by the starting (in a step S65 or S66) of this HDD controller 47.

In addition, although not shown, acquisition/release of the resource of HDD 48 is also controllable through the HDD controller 47. Further, exclusive control at the time of resource acquisition of HDD 48 can be permitted only at the time of the data transfer by the HDD controller 47, and the exclusive control at the time of resource acquisition of HDD 48 can be performed at the time of the data transfer. In this case, during the exclusive control, CPU interruption processing for recognizing the progress state of processing, i.e., the data transfer by the code transfer DMAC 45, by CPU interruption generated by the code transfer DMAC 45, is not performed. Thereby, the processing at the time of the data transfer by the HDD controller 47 is independently controllable.

FIGS. 20A and 20B show a timing chart for illustrating processing in case the memory control part 43 performs the exclusive control at the time of resource acquisition of HDD 48.

Moreover, FIGS. 21A and 21B show a timing chart for illustrating processing in case the memory control part 43 does not perform the exclusive control even at the time of resource acquisition of HDD 48.

FIG. 20A and FIG. 21A show the minimum time required for the data transfer by the HDD controller 47. As processing by CPU interruption generated by the code transfer DMAC 45 is not performed when the memory control part 43 performs the exclusive control at the time of resource acquisition of HDD 48, as shown in FIG. 20B, the time required for the data transfer by the HDD controller 47 does not increase, and, thus, the time is always the minimum time.

As for the memory control part 43, it is preferable to determine the data transfer start timing by the image transfer DMAC 44 and the code transfer DMAC 45 such that the end time of the data transfer by the image input and output DMAC 41 be coincident with the end time of the data transfer by the image transfer DMAC 44 and the code transfer DMAC 45.

Figure 22:
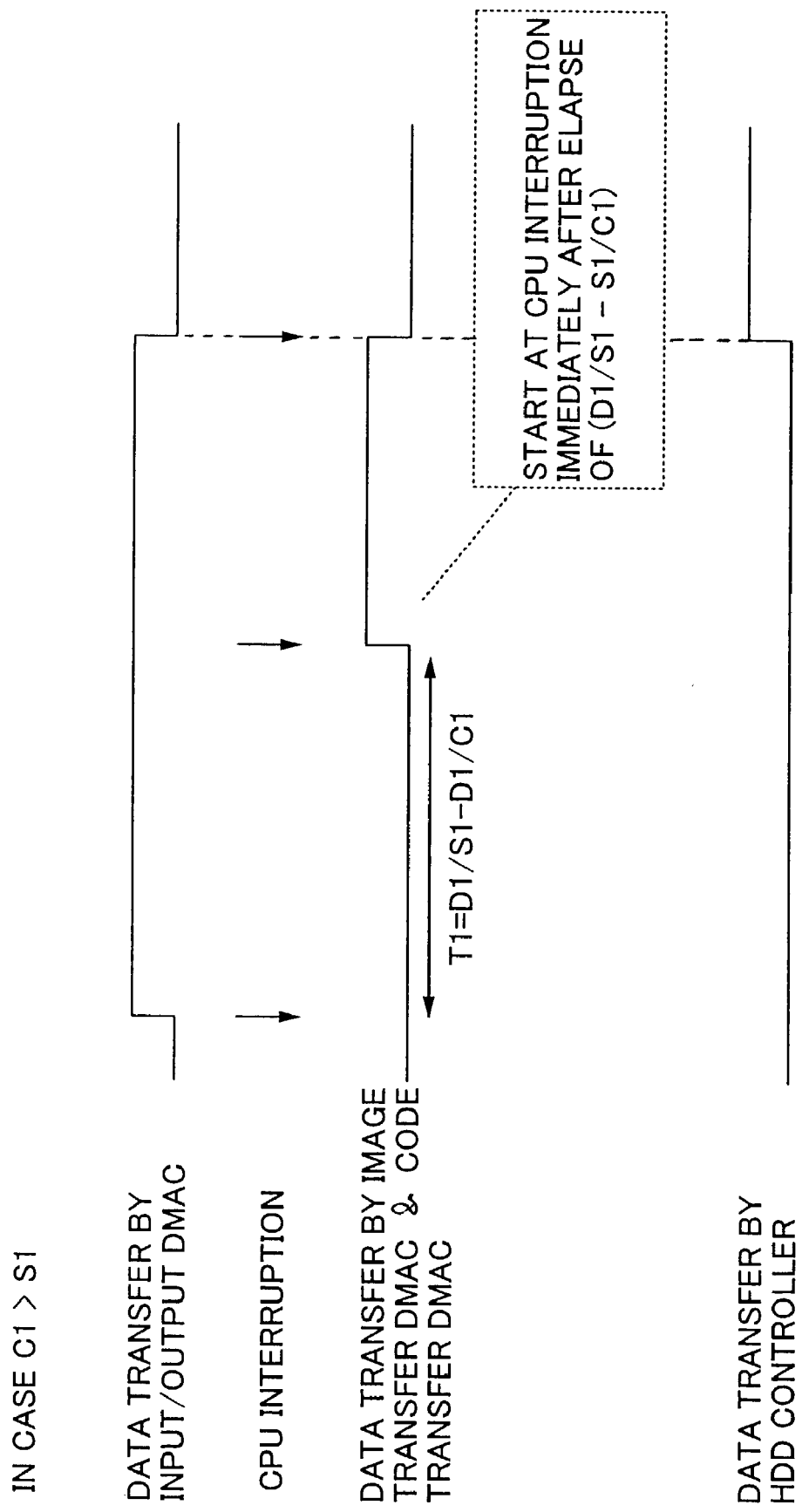
FIG. 22 shows a timing chart for illustrating data transfer start timing by the image transfer DMAC and code transfer DMAC when the data transfer rate by the image input and output DMAC is slower than the compression processing rate with the compression/decompression unit of FIG. 14.

FIG. 22 is a timing chart in another example of illustrating data transfer start timing by the image transfer DMAC 44 and the code transfer DMAC 45 when the data transfer rate S1 by the image input and output DMAC 41 is slower than the compression processing rate C1 with the compression/decompression unit 46.

Moreover, FIG. 23 is a timing chart in another example of illustrating data transfer start timing by the image transfer DMAC 44 and the code transfer DMAC 45 when the compression processing rate C1 with the compression/decompression unit 46 is slower than the data transfer rate S1 by the image input and output DMAC 41.

As can be seen from FIG. 22, in this example when S1 is slower than C1, the data transfer start timing is determined so that, after the data transfer by the image input and output DMAC 41 is started, T1 (D1/S1−D1/C1) elapses, and, then, the data transfer by the image transfer DMAC 44 and the code transfer DMAC 45 be started at the time of CPU interruption generated subsequently by the image input and output DMAC 41. The image transfer DMAC 44 and the code transfer DMAC 45 are started according to the timing.

Consequently, the end time of the data transfer by the image input and output DMAC 41 and the end time of the data transfer by the image transfer DMAC 44 and the code transfer DMAC 45 can be made coincident.

When C1 is slower than S1, the data transfer start timing is determined such that the data transfer by the image transfer DMAC 44 and the code transfer DMAC 45 be started at the time of the first CPU interruption generated by the image input and output DMAC 41 immediately after starting of the data transfer by the image input and output DMAC 41, as shown in FIG. 23. Then, according to the timing, the image transfer DMAC 44 and the code transfer DMAC 45 are started.

In this case, the end time of the data transfer by the image transfer DMAC 44 and the code transfer DMAC 45 becomes later than the end time of the data transfer by the image input and output DMAC 41 as shown. Therefore, the end times cannot be made in agreement.

In a case the memory control part 43 rotates image data input from the image input and output DMAC 41 and writes the result into the ordinary image memory area in the image memory 42, it is preferable that, after the data transfer (writing into the ordinary image data area of the image memory after the image rotation) by the image input and output DMAC 41 is completed, the data transfer by the image transfer DMAC 44 and the code transfer DMAC 45 be started.

The memory control part 43 may be made to perform the following control operation, when the amount (for example, the number of data transfer lines on one descriptor by the image input and output DMAC 41) of image data written in the ordinary image memory area in the image memory 42 by the image input and output DMAC 41 exceeds a predetermined amount (capacity of the ordinary image memory area of the image memory 42) set up beforehand. That is, the above-mentioned series of data transfer operation performed by the image transfer DMAC 44, the code transfer DMAC 45, and the HDD controller 47 are not performed, but, instead, a series of image transfer operations performed by the image transfer DMAC 44 and the HDD controller 47 are performed. Consequently, the image data written in the ordinary image memory area 42*a* in the image memory 42 by the image input and output DMAC 41 is transferred to the compression/decompression unit 46 by the image transfer DMAC 44, and by the HDD controller 47, the code data which is image data after the compression processing with the compression/decompression unit 46 is transferred directly to HDD 48, and then, is written into the HD.

In this case, it is preferable to determine the data transfer start timings by the image transfer DMAC 44 and the HDD controller 47 such that the data transfer by the image transfer DMAC 44 and the HDD controller 47 do not pass by the data transfer by the image input and output DMAC 41.

Thus, in the digital copier by the second embodiment of the present invention, the memory control part 43 recognizes the compression processing rate with the compression/decompression unit 46, the data transfer rate (data transfer rate from the image reading part 1 or the FAX section 3 to the ordinary image memory area 42*a* in the image memory 42) by the image input and output DMAC 41, and the progress state of the data transfer by the image input and output DMAC 41, respectively. Then, based on the recognition results, the data transfer start timing (start timing of the data transfer to the compression/decompression unit 46 from the ordinary image memory area in the image memory 42 and the data transfer to the converted image memory area 42*b* in the image memory 42 from the compression/decompression unit 46) by the image transfer DMAC 44 and the code transfer DMAC 45 is determined.

Furthermore, the compression processing rate with the compression/decompression unit 46, the data transfer rate (data transfer rate from the converted image memory area 42*b* in the image memory 42 to HDD 48) by the HDD controller 47, and the progress state of the data transfer by the code transfer DMAC 45 are recognized, respectively. Then, based on the recognition results, the data transfer start timing by the HDD controller 47 is determined.

That is, it becomes possible to know the shortest processing time required for the data transfer and writing on the storage by recognizing the data transfer rate (capability), on each storage which outputs and inputs image data (writing and read-out), i.e., the image memory 42 and HDD 48, also, the compression processing rate (capability) of the compression/decompression unit 46, and the progress state of each data transfer.

Therefore, it becomes possible to determine the data transfer start timing by the image transfer DMAC 44 and the code transfer DMAC 45, and the data transfer start timing by the HDD controller 47, respectively, by which the occupancy time of the image memory 42 can be made shortest.

Consequently, the image data input from the image reading part 1 or the FAX section 3 can be efficiently transferred to HDD 48 with high accuracy via the image memory 42 and compression/decompression unit 46, without substantially modifying/altering software, even when data transfer rate changes according to replacement of the various sets of hardware containing the image reading part 1, the FAX section 3, HDD 48, and the compression/decompression unit 46.

Furthermore, it becomes possible, by recognizing the data transfer rate to each storage, to perform optimal timing control according to the characteristic of the storage.

As for the memory control part 43, it is preferable to control acquisition/release of the resource of HDD 48 through the HDD controller 47, and to permit the exclusive control at the time of resource acquisition only at the time of the data transfer by the HDD controller 47. Consequently, since occupying HDD 48 uselessly is avoided, the use efficiency of HDD 48 can also be raised.

Moreover, it is preferable for the memory control part 43 to performs a control such that, in case the data transfer rate by the image input and output DMAC 41 is slower than the compression processing rate with the compression/decompression unit 46, the data transfer start timing by the image transfer DMAC 44 and the code transfer DMAC 45 is determined such that the end time of the data transfer by the image input and output DMAC 41 coincides with the end time of data transfer by the image transfer DMAC 44 and the code transfer DMAC 45.

Consequently, it becomes possible to perform image input operation smoothly, without being obstructed by difference in the data transfer time according to the configuration of each storage.

For example, in case the image reading part (image scanner) is used and the original of a plurality of sheets of paper is input continuously, it becomes possible, by determining the data transfer start timing by the image transfer DMAC 44 and the code transfer DMAC 45, as mentioned above to avoid a problematic situation, as described above.

When the memory control part 43 rotates the image data input from the image input and output DMAC 41, and then writes the result in the ordinary image memory area in the image memory 42, it is preferable that, after the data transfer by the image input and output DMAC 41 is completed including image rotation processing, the data transfer by the image transfer DMAC 44 and the code transfer DMAC 45 is started. Consequently, the load of CPU in the memory control part 43 can be effectively reduced.

In case the memory control part 43 reads an image of a long dimension by the image reading part 1, when a predetermined amount (capacity of the ordinary image memory area of the image memory 42) transferred by the image input and output DMAC 41 set beforehand is exceeded, it is preferable not to perform the series of data transfer operations by the image transfer DMAC 44, the code transfer DMAC 45, and the HDD controller 47, but, instead, to perform a series of data transfer operations by the image transfer DMAC 44 and the HDD controller 47. Consequently, the image data input from the image reading part 1 can be certainly transferred to HDD 48 via the image memory 42, without providing special measures.

In this case, it is preferable to determine the data transfer start timing by the image transfer DMAC 44 and the HDD controller 47 such that data transfer by the image transfer DMAC 44 and the HDD controller 47 does not pass by the data transfer by the image input and output DMAC 41.

Consequently, it becomes possible to transfer efficiently the image data input from the image reading part 1 to HDD 8 with high accuracy via the image memory 42.

Furthermore, it is preferable to provide the function in the compression/decompression unit 46 to measure the compression processing rate; in the image input and output DMAC 41 and the HDD controller 47 each to measure the data transfer rate, respectively.

Consequently, even when replacement of the image memory 42 or HDD 48 each of which is storage may be performed, the memory control part 43 can recognize those data transfer rate and compression processing rate by acquiring the measurement result from the compression/decompression unit 46 for the compression processing rate and the measurement result of data transfer rate from the image input and output DMAC 41 and the HDD controller 47, respectively.

Consequently, the optimal timing suitable for the characteristic of the storage after replacement can be determined as each data transfer start timing mentioned above. Therefore, it becomes possible to transfer efficiently the image data input from the image reading part 1 to HDD 48 with high accuracy via the image memory 42.

In this case, the image input and output DMAC 41 and the HDD controller 47, and the compression/decompression unit 46 measure the data transfer rates and compression processing rate, respectively, according to the instructions from the operation part 6 corresponding to key operation on the operation part 6 by a user. Consequently, adverse affection onto the copy productivity/yield in the digital copier can be avoided. Moreover, the load of CPU of the memory control part 43 can also be reduced.

Alternatively, the data transfer rate may be measured at the time of image data input by the image input and output DMAC 41 by the image input and output DMAC 41 and by the HDD controller 47, and also the compression/decompression unit 46 may measure the compression processing rate at the time of the input of the image data by the image input and output DMAC 41.

Consequently, a user does not need to give measurement instructions of data transfer rate to the image input and output DMAC 41 and the HDD controller 47 by key operation on the operation part 6, and it is not necessary to give measurement instructions of compression processing rate to the compression/decompression unit 46, respectively. Therefore, the load of the user can be reduced.

In addition, although the memory control part 43 secures the converted image memory area 42b beforehand to the image memory 42 in the second embodiment, it is also possible to perform the same operation when starting processing of FIG. 15.

As described above, although the embodiments of the digital copier have been described, the present invention can be applied not only to this but to other image processing apparatus, such as facsimile apparatus and a printer.

Moreover, present invention is also applicable to image input/output apparatuses, such as a scanner and a network file server, also to a digital composite machine which has a plurality of functions of those image input/output apparatus and image processing apparatus.

Thus, according to the present invention, it is possible to make the end time of data transfer and writing into a first storage coincide with the end time of data transfer and writing from the first storage to a second storage for the same data. As a result, it is possible to avoid a situation from occurring in which no data remains in the first storage to be sent to the second storage before predetermined data transfer into the first storage is finished. Accordingly, it is possible to avoid a situation from occurring in which data transfer from the first storage to the second storage should be interrupted before the data transfer to the first storage is completed.

Conversely, it is also possible to avoid a situation from occurring in which, as the starting time of transfer from the first storage to the second storage is too lately, data transfer from the first storage to the second storage should continue for a considerable time after the completion of data transfer into the first storage.

Accordingly, it is possible to achieve efficient use of each storage. Especially, it is possible to achieve efficient use of a secondary storage such as HDD. That is, if a situation occurred in which, as the data transfer were started too early from the first storage to the second storage, the data transfer thus started should be interrupted before the completion of data transfer into the first storage, the second storage should be occupied for a uselessly long time. If so, the efficient use of the second storage would be obstructed.

Furthermore, if a situation occurred in which, as the data transfer from the first storage to the second storage were too lately, the data transfer should continue from the first storage to the second storage for a considerably long time after the completion of data transfer to the first storage, a total time required for data input on a series of data transfer operations including the data transfer to the first storage and data transfer from the first storage to the second storage would become increased uselessly. If so, the yield on the image processing apparatus such as copier would be degraded.

Accordingly, according to the present invention, it is possible to achieve efficient operation of image processing apparatus by eliminating occurrence of useless time.

Further, the present invention is not limited to the above-described embodiments, and variations and modifications may be made without departing from the scope of the present invention.

The present application is based on Japanese priority applications Nos. 2001-216429 and 2001-199435, filed on Jul. 17, 2001 and Jun. 29, 2001, the entire contents of which are hereby incorporated by reference.

What is claimed is:

1. An image processing apparatus, comprising:
a first storage storing input image data;
a second storage storing image data read from the first storage;
a control part determining, with respect to a timing at which a data transfer of image data into the first storage is started, a timing at which a data transfer of said image data from the first storage to the second storage is started, based on a rate of data transfer and writing of the image data into the first storage, and a rate of data transfer and writing of the image data into the second storage from the first storage, wherein said rate of data transfer and writing of the image data into the first storage is calculated by using a number of lines to be transferred;
a reading part reading input image data;
a first transfer part transferring the input image data to the first storage from the reading part; and
a second transfer part transferring the input image data to the second storage from the first storage,
wherein said control part comprises:
a first data transfer rate recognition part recognizing a data transfer rate on the first data transfer part;
a first progress state recognition part recognizing a progress state of data transfer by the first data transfer part;
a second data transfer rate recognition part recognizing a data transfer rate on the second data transfer part; and
a second progress state recognition part recognizing a progress state of data transfer by the second data transfer part,
wherein the control part determines, with respect to a timing at which data transfer of image data into the first storage is started, a timing of data transfer of the said image data from the first storage to the second storage is started, based on recognition results of the first data transfer rate recognition part, first progress state recognition part, the apparatus second data transfer rate recognition part and second progress state recognition part, the apparatus further comprising:
a resource control part controlling acquisition and release of a resource of the second storage; and
an exclusive control permission part permitting exclusive control at a time of resource acquisition by the resource control part only at a time of data transfer by the second data transfer part.

2. An image processing apparatus, comprising:
a first storage storing input image data;
a second storage storing image data read from the first storage;
a control part determining, with respect to a timing at which a data transfer of image data into the first storage is started, a timing at which a data transfer of said image data from the first storage to the second storage is started, based on a rate of data transfer and writing of the image data into the first storage, and a rate of data transfer and writing of the image data into the second storage from the first storage, wherein said rate of data transfer and writing of the image data into the first storage is calculated by using a number of lines to be transferred;
a reading part reading input image data;
a first transfer part transferring the input image data to the first storage from the reading part; and
a second transfer part transferring the input image data to the second storage from the first storage,
wherein said control part comprises:
a first data transfer rate recognition part recognizing a data transfer rate on the first data transfer part;
a first progress state recognition part recognizing a progress state of data transfer by the first data transfer part;
a second data transfer rate recognition part recognizing a data transfer rate on the second data transfer part; and
a second progress state recognition part recognizing a progress state of data transfer by the second data transfer part,
wherein the control part determines, with respect to a timing at which data transfer of image data into the first storage is started, a timing of data transfer of the said image data from the first storage to the second storage is started, based on recognition results of the first data transfer rate recognition part, first progress state recognition part, second data transfer rate recognition part and second progress state recognition part, and wherein:
the first data transfer part comprises an image rotation part rotating input image data from the reading part, and writes the result into the first storage; and
the control part determines the data transfer start timing such that data transfer of the second data transfer part is started after the completion of data transfer by the first data transfer part.

3. An image processing apparatus, comprising:
a first storage storing input image data;
a second storage storing image data read from the first storage;
a control part determining, with respect to a timing at which a data transfer of image data into the first storage is started, a timing at which a data transfer of said image data from the first storage to the second storage is started, based on a rate of data transfer and writing of the image data into the first storage, and a rate of data transfer and writing of the image data into the second storage from the first storage, wherein said rate of data transfer and writing of the image data into the first storage is calculated by using a number of lines to be transferred;
a reading part reading input image data;
a first transfer part transferring the input image data to the first storage from the reading part; and
a second transfer part transferring the input image data to the second storage from the first storage,
wherein said control part comprises:
a first data transfer rate recognition part recognizing a data transfer rate on the first data transfer part;
a first progress state recognition part recognizing a progress state of data transfer by the first data transfer part;
a second data transfer rate recognition part recognizing a data transfer rate on the second data transfer part; and
a second progress state recognition part recognizing a progress state of data transfer by the second data transfer part,
wherein the control part determines, with respect to a timing at which data transfer of image data into the first storage is started, a timing of data transfer of the said image data from the first storage to the second storage is started, based on recognition results of the first data transfer rate recognition part, first progress state recognition part, second data transfer rate recognition part and second progress state recognition part;
the first transfer rate recognition part is configured to measure the data transfer rate of the first transfer part;
the second transfer rate recognition part is configured to measure the data transfer rate of the second transfer part;
the first transfer rate recognition part measures data transfer rate on the first data transfer part in response to external instructions; and
the second transfer rate recognition part measures data transfer rate on the second data transfer part in response to the external instructions.

4. An image processing apparatus, comprising:
a first storage storing input image data;
a data transform part performing a data transform on image data read out from the first storage, wherein after the data transform, the image data is transferred and written into the first storage;
a second storage storing image data read from the first storage and having undergone the data transform;
a first control part determining a timing at which data transfer from the first storage to the data transform part is started, based on (1) a transfer and writing rate of input image data into the first storage, and (2) a data transform rate of the data transform part;
a second control part determining a timing of data transfer of image data having undergone the data transform into the second storage from the first storage, based on a rate at which the image data is transferred from the first storage into the data transform part, and a rate at which the image data having undergone the data transform is transferred and written into the second storage from the first storage,
a reading part reading input image data;
a first transfer part transferring and writing into an ordinary storage area of the first storage from the reading part;
a transform transfer part transferring from the ordinary storage area of the first strange into the data transform part, and transferring and writing the image data having undergone the data transform into a converted storage area of the first storage;
a second transfer part transferring and writing into the second storage from the converted storage area of the first storage;
a first data transfer rate recognition part recognizing data transfer and writing rate on the first transfer part;
a first progress state recognition part recognizing a progress state of data transfer and writing on the first transfer part;
a transform rate recognition part recognizing data transform rate on the data transfer part;
a transform progress state recognition part recognizing a progress state on data transfer and writing on the transform transfer part; and
a second data transfer rate recognition part recognizing data transfer and writing rate on the second transfer part,
wherein:
the first control part determines a timing at which data transfer from first storage to the data transform part, based on recognition results of the transform rate recognition part, first transfer rate recognition part and first progress state recognition part; and
the second control part determines a timing at which data transfer of the image data having undergone the data transform from the first storage to the second storage, based on recognition results of the transform rate recognition part, second transfer rate recognition part and transform progress state recognition part.

5. The image processing apparatus as claimed in claim 4, further comprising:
a resource control part controlling acquisition and release of a resource of the second storage; and
an exclusive control permission part permitting exclusive control at a time of resource acquisition by the resource control part only at a time of data transfer by the second data transfer part.

6. The image processing apparatus as claimed in claim 4, wherein:
said control part determines data transfer start timing on the transform transfer part such that data transfer end time on the first data transfer part and data transfer end time on the transform transfer part on the same data be coincident.

7. The image processing apparatus as claimed in claim 4, wherein:
the first data transfer part comprises an image rotation part rotating input image data from the reading part, and writes the result into the first storage; and
the control part determines the data transfer start timing such that data transfer of the transform transfer part is started after the completion of data transfer by the first data transfer part in case the image rotation part is used.

8. The image processing apparatus as claimed in claim 4, further comprising a third data transform part transferring the image data written into the first storage into the data transform part, and directly transferring and writing the image data having undergone the data transform into the second storage; and
a transfer control part not causing the transform transfer part to perform data transfer but causing the third transfer part to perform data transfer when the amount of image data written into the first storage by the first transfer part exceeds a predetermined amount.

9. The image processing apparatus as claimed in claim 4, further comprising a third control part determining data transfer start timing on the third data transfer part such that data transfer by the third data transfer part does not pass by data transfer by the first data transfer part.

10. The image processing apparatus as claimed in claim 4, wherein:
the transform rate recognition part is configured to measure the data transform rate on the data transform part; and
the first transfer rate recognition part is configured to measure the data transfer rate on the first data transfer part; and
the second transfer rate recognition part is configured to measure the data transfer rate on the second data transfer part.

11. The image processing apparatus as claimed in claim 10, wherein:
the transform rate recognition part measures data transform rate on the data transform part at a time the reading part inputs image data;
the first transfer rate recognition part measures data transfer rate on the first data transfer part at a time the reading part inputs image data; and
the second transfer rate recognition part measures data transfer rate on the second data transfer part at a time the reading part inputs image data.

12. The image processing apparatus as claimed in claim 10, wherein:
the transform rate recognition part measures data transform rate on the data transform part in response to external instruction;
the first transfer rate recognition part measures data transfer rate on the first data transfer part in response to the external instructions; and
the second transfer rate recognition part measures data transfer rate on the second data transfer part in response to the external instructions.

13. An image processing apparatus, comprising:
a first storage storing input image data;
a data transform part performing a data transform on image data read out from the first storage, wherein after the data transform, the image data is transferred and written into the first storage;
a second storage storing image data read from the first storage and having undergone the data transform;
a first control part determining a timing at which data transfer from the first storage to the data transform part is started, based on (1) a transfer and writing rate of input image data into the first storage, and (2) a data transform rate of the data transform part; and
a second control part determining a timing of data transfer of image data having undergone the data transform into the second storage from the first storage, based on a rate at which the image data is transferred from the first storage into the data transform part, and a rate at which the image data having undergone the data transform is transferred and written into the second storage from the first storage, the apparatus further comprising an image output part printing out input image data stored in the second storage,
wherein input image data is read out from the second storage according to a predetermined timing, and is printed out by the image output part.

14. An image processing apparatus, comprising:
first storage means for storing input image data;
second storage means for storing image data read from the first storage means;
control means for determining, with respect to a timing at which data transfer of image data into the first storage means, a timing at which data transfer of the said image data from the first storage means to the second storage means, based on a rate of data transfer and writing of the image data into the first storage means and rate of data transfer and writing of the image data into the second storage means from the first storage means, wherein said rate of data transfer and writing of the image data into the first storage is calculated by using a number of lines to be transferred;
reading means for reading input image data;
first transfer means for transferring the input image data to the first storage means from the reading means; and
second transfer means for transferring the input image data to the second storage means from the first storage means,
wherein said control means comprises:
first data transfer rate recognition means for recognizing a data transfer rate on the first transfer means;
first progress state recognition means for recognizing a progress state of data transfer on the first transfer means;
a second data transfer rate recognition means for recognizing a data transfer rate on the second transfer means; and
a second progress state recognition means for recognizing a progress state of data transfer on the second transfer means,
wherein the control means determines, with respect to a timing at which data transfer of image data into the first storage means is started, a timing of data transfer of the said image data from the first storage means to the second storage means is started, based on recognition results of the first data transfer rate recognition means, first progress state recognition means, second data transfer rate recognition means and second progress state recognition means, the apparatus further comprising:
resource control means for controlling acquisition and release of a resource of the second storage means; and
exclusive control permission means for permitting exclusive control at a time of resource acquisition by the resource control means only at a time of data transfer by the second data transfer means.

15. An image processing apparatus, comprising:
first storage means for storing input image data;
second storage means for storing image data read from the first storage means;
control means for determining, with respect to a timing at which data transfer of image data into the first storage means, a timing at which data transfer of the said image data from the first storage means to the second storage means, based on a rate of data transfer and writing of the image data into the first storage means and rate of data transfer and writing of the image data into the second storage means from the first storage means, wherein said rate of data transfer and writing of the image data into the first storage is calculated by using a number of lines to be transferred;
reading means for reading input image data;
first transfer means for transferring the input image data to the first storage means from the reading means; and
second transfer means for transferring the input image data to the second storage means from the first storage means,
wherein said control means comprises:
first data transfer rate recognition means for recognizing a data transfer rate on the first transfer means;
first progress state recognition means for recognizing a progress state of data transfer on the first transfer means;
a second data transfer rate recognition means for recognizing a data transfer rate on the second transfer means; and
a second progress state recognition means for recognizing a progress state of data transfer on the second transfer means,
wherein the control means determines, with respect to a timing at which data transfer of image data into the first storage means is started, a timing of data transfer of the said image data from the first storage means to the second storage means is started, based on recognition results of the first data transfer rate recognition means, first progress state recognition means, second data transfer rate recognition means and second progress state recognition means, and wherein:
the first data transfer means comprises image rotation means for rotating input image data from the reading means, and writes the result into the first; and
the control means determines the data transfer start timing such that data transfer of the second data transfer means is started after the completion of data transfer by the first data transfer means when the image rotation means is used.

16. An image processing apparatus, comprising:

first storage means for storing input image data;

second storage means for storing image data read from the first storage means;

control means for determining, with respect to a timing at which data transfer of image data into the first storage means, a timing at which data transfer of the said image data from the first storage means to the second storage means, based on a rate of data transfer and writing of the image data into the first storage means and rate of data transfer and writing of the image data into the second storage means from the first storage means, wherein said rate of data transfer and writing of the image data into the first storage is calculated by using a number of lines to be transferred;

reading means for reading input image data;

first transfer means for transferring the input image data to the first storage means from the reading means; and second transfer means for transferring the input image data to the second storage means from the first storage means, wherein said control means comprises:

first data transfer rate recognition means for recognizing a data transfer rate on the first transfer means;

first progress state recognition means for recognizing a progress state of data transfer on the first transfer means;

a second data transfer rate recognition means for recognizing a data transfer rate on the second transfer means; and a second progress state recognition means for recognizing a progress state of data transfer on the second transfer means, wherein the control means determines, with respect to a timing at which data transfer of image data into the first storage means is started, a timing of data transfer of the said image data from the first storage means to the second storage means is started, based on recognition results of the first data transfer rate recognition means, first progress state recognition means, second data transfer rate recognition means and second progress state recognition means;

the first transfer rate recognition means measures the data transfer rate of the first transfer means;

the second transfer rate recognition means measures the data transfer rate of the second transfer means;

the first transfer rate recognition means measures data transfer rate on the first data transfer means in response to external instructions; and the second transfer rate recognition means measures data transfer rate on the second data transfer means in response to the external instructions.

17. An image processing apparatus, comprising:

first storage means for storing input image data;

data transform means for performing data transform on image data read out from the first storage means, wherein after the data transform, the image data is transferred and written into the first storage;

second storage means for storing image data read from the first storage means and having undergone the data transform;

first control means for determining a timing at which data transfer from the first storage means to the data transform means is started, based on transfer and writing rate of input image data into the first storage means, and data transform rate of the data transform means; and second control means for determining a timing at which data transfer of image data having undergone the data transform into the second storage means from the first storage means, based on a rate at which the image data is transferred from the first storage means into the data transform means, and a rate at which the image data having undergone the data transform is transferred and written into the second storage means from the first storage means, the apparatus further comprising:

reading means for reading input image data;

first transfer means for transferring and writing into an ordinary storage means area of the first storage means from the reading means;

transform transfer means for transferring from the ordinary storage means area of the first storage means into the data transform means, and transferring and writing the image data having undergone the data transform into a converted storage means area of the first storage means;

second transfer means for transferring and writing into the second storage means from the converted storage means area of the first storage means;

first data transfer rate recognition means for recognizing data transfer and writing rate on the first transfer means;

first progress state recognition means for recognizing a progress state of data transfer and writing on the first transfer means;

transform rate recognition means for recognizing data transform rate on the data transfer means;

transform progress state recognition means for recognizing a progress state on data transfer and writing by the transform transfer means; and second data transfer rate recognition means for recognizing data transfer and writing rate on the second transfer means, wherein:

the first control means determines timing at which data transfer from first storage means to the data transform means is started, based on recognition results of the transform rate recognition means, first transfer rate recognition means and first progress state recognition means; and the second control means determines timing at which data transfer of the image data having undergone the data transform from first storage means to the second storage means is started, based on recognition results of the transform rate recognition means, second transfer rate recognition means and transform progress state recognition means.

18. The image processing apparatus as claimed in claim 17, further comprising:

resource control means for controlling acquisition and release of a resource of the second storage means; and exclusive control permission means for permitting exclusive control at a time of resource acquisition by the resource control means only at a time of data transfer by the second data transfer means.

19. The image processing apparatus as claimed in claim 17, wherein:

said control means determines data transfer start timing on the transform transfer means such that data transfer end time on the first data transfer means and data transfer end time on the transform transfer means for the same data be coincident.

20. The image processing apparatus as claimed in claim 17, wherein:

the first data transfer means comprises image rotation means for rotating input image data from the reading means, and writes the result into the first; and the control means determines the data transfer start timing such that data transfer of the transform transfer means is started after the completion of data transfer by the first data transfer means in case the image rotation means is used.

21. The image processing apparatus as claimed in claim 17, further comprising third data transform means for transferring the image data written into the first storage means into the data transform means, and directly transferring and writing the image data having undergone the data transform into the second storage means; and transfer control means for not causing the transform transfer means to perform data transfer but causing the third transfer means to perform data transfer when the amount of image data written into the first storage means by the first transfer means exceeds a predetermined amount.

22. The image processing apparatus as claimed in claim 17, further comprising third control means for determining data transfer start timing on the third data transfer means such that data transfer by the third data transfer means does not pass by data transfer by the first data transfer means.

23. The image processing apparatus as claimed in claim 17, wherein:

the transform rate recognition means measures the transform rate of the data transform means; and the first transfer rate recognition means measures the data transfer rate of the first transfer means; and the second transfer rate recognition means measures the data transfer rate of the second transfer means.

24. The image processing apparatus as claimed in claim 20, wherein:

the transform rate recognition means measures data transform rate on the data transform means at a time the reading means inputs image data;

the first transfer rate recognition means measures data transfer rate on the first data transfer means at a time the reading means inputs image data; and the second transfer rate recognition means measures data transfer rate on the second data transfer means at a time the reading means inputs image data.

25. The image processing apparatus as claimed in claim 20, wherein:

the transform rate recognition means measures data transform rate on the data transform means in response to external instruction;

the first transfer rate recognition means measures data transfer rate on the first data transfer means in response to the external instructions; and the second transfer rate recognition means measures data transfer rate on the second data transfer means in response to the external instructions.

26. An image processing apparatus, comprising:

first storage means for storing input image data;

data transform means for performing data transform on image data read out from the first storage means, wherein after the data transform, the image data is transferred and written into the first storage;

second storage means for storing image data read from the first storage means and having undergone the data transform;

first control means for determining a timing at which data transfer from the first storage means to the data transform means is started, based on transfer and writing rate of input image data into the first storage means, and data transform rate of the data transform means; and second control means for determining a timing at which data transfer of image data having undergone the data transform into the second storage means from the first storage means, based on a rate at which the image data is transferred from the first storage means into the data transform means, and a rate at which the image data having undergone the data transform is transferred and written into the second storage means from the first storage means, the apparatus further comprising:

image output means for printing out input image data stored in the second storage means, wherein input image data is read out from the second storage according to a predetermined timing, and is printed out by the image output means.

* * * * *